(12) United States Patent
Omodani et al.

(10) Patent No.: US 12,244,953 B2
(45) Date of Patent: Mar. 4, 2025

(54) PHOTOELECTRIC CONVERSION DEVICE AND PHOTODETECTION SYSTEM

(71) Applicant: CANON KABUSHIKI KAISHA, Tokyo (JP)

(72) Inventors: Satoshi Omodani, Tokyo (JP); Shingo Hikosaka, Kanagawa (JP); Takeru Ohya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 18/320,901

(22) Filed: May 19, 2023

(65) Prior Publication Data

US 2023/0388678 A1 Nov. 30, 2023

(30) Foreign Application Priority Data

May 25, 2022 (JP) ................................ 2022-085325

(51) Int. Cl.
*H04N 5/335* (2011.01)
*H04N 25/76* (2023.01)
*H04N 25/767* (2023.01)
*H04N 25/773* (2023.01)
*H04N 25/78* (2023.01)

(52) U.S. Cl.
CPC ......... *H04N 25/773* (2023.01); *H04N 25/767* (2023.01); *H04N 25/7795* (2023.01); *H04N 25/78* (2023.01)

(58) Field of Classification Search
CPC .................................................. H04N 25/773
See application file for complete search history.

(56) References Cited

U.S. PATENT DOCUMENTS

| 11,105,935 | B2* | 8/2021 | Negishi | G01T 1/247 |
| 11,297,269 | B2* | 4/2022 | Yasuda | H04N 25/773 |
| 11,846,542 | B2* | 12/2023 | Yamazaki | H04N 25/702 |
| 11,997,401 | B2* | 5/2024 | Kim | H04N 25/58 |
| 12,085,677 | B2* | 9/2024 | Tsai | G01S 17/36 |
| 2020/0033482 | A1 | 1/2020 | Negishi | |
| 2022/0120610 | A1 | 4/2022 | Numata | |
| 2023/0224609 | A1* | 7/2023 | Hikosaka | H04N 25/77 348/294 |

FOREIGN PATENT DOCUMENTS

JP    2019017065 A    1/2019

* cited by examiner

*Primary Examiner* — Gary C Vieaux
(74) *Attorney, Agent, or Firm* — Canon U.S.A., Inc. IP Division

(57) ABSTRACT

A photoelectric conversion device includes a pixel including a photoelectric conversion unit configured to output a pulse in response to incidence of a photon, a counting unit including a plurality of counters each configured to count pulses output from the photoelectric conversion unit, and a calculation unit configured to perform calculation processing on a plurality of count values held by the plurality of counters, and an output line connected to the pixel. The calculation unit outputs a determination value indicating a relationship between the plurality of count values. The pixel outputs a pixel signal including a determination value to the output line.

22 Claims, 19 Drawing Sheets

P_DATA_OUT

P_DATA_OUT

P_DATA_OUT

P_DATA_OUT

FIG. 10A

| n-th FRAME CALCULATION RESULT | n-th FRAME DETERMINATION VALUE |
|---|---|
| n-th FRAME COUNT VALUE − (n-1)-th FRAME COUNT VALUE ≧ OFFSET VALUE offset | 1 |
| n-th FRAME COUNT VALUE − (n-1)-th FRAME COUNT VALUE < OFFSET VALUE offset | 0 |

FIG. 10B

| n-th FRAME COUNT VALUE | n-th FRAME DETERMINATION VALUE | n-th FRAME SIGNAL P_DATA_OUT |
|---|---|---|
| P_DATA_A | 1 | OUTPUT DATA B |
| P_DATA_A | 0 | OUTPUT DATA A |
| P_DATA_B | 1 | OUTPUT DATA A |
| P_DATA_B | 0 | OUTPUT DATA B |

FIG. 10C

OUTPUT DATA A

| A9 |
| A8 |
| A7 |
| A6 |
| A5 |
| A4 |
| A3 |
| A2 |
| A1 |
| J |

FIG. 10D

OUTPUT DATA B

| B9 |
| B8 |
| B7 |
| B6 |
| B5 |
| B4 |
| B3 |
| B2 |
| B1 |
| J |

FIG. 12

| n-th FRAME COUNT VALUE | n-th FRAME DETERMINATION VALUE | n-th FRAME DETERMINATION VALUES OF SURROUNDING PIXELS | n-th FRAME SIGNAL P_DATA_OUT |
|---|---|---|---|
| P_DATA_A | 1 | ALL 0 | OUTPUT DATA B |
| | | OTHER THAN ABOVE | OUTPUT DATA A |
| | 0 | ALL 0 | OUTPUT DATA A |
| | | OTHER THAN ABOVE | OUTPUT DATA A |
| P_DATA_B | 1 | ALL 0 | OUTPUT DATA A |
| | | OTHER THAN ABOVE | OUTPUT DATA B |
| | 0 | ALL 0 | OUTPUT DATA B |
| | | OTHER THAN ABOVE | OUTPUT DATA B |

PHOTOELECTRIC CONVERSION DEVICE AND PHOTODETECTION SYSTEM

BACKGROUND

Technical Field

The aspect of the embodiments relates to a photoelectric conversion device and a photodetection system.

Description of the Related Art

As a photoelectric conversion element, an APD (Avalanche Photo Diode) and SPAD (Single Photon Avalanche Diode) in which charge generated by incidence of photons are multiplied by avalanche breakdown are known. These photoelectric conversion elements are used in a photoelectric conversion device having a function of counting the number of detected photons. Japanese Patent Application Laid-Open No. 2019-017065 discloses a photoelectric conversion device in which a plurality of counters is provided in a pixel, and a readout time can be shortened by outputting a signal when a change in the number of pulses detected per unit time is larger than a predetermined value.

However, although the photoelectric conversion device disclosed in Japanese Patent Application Laid-Open No. 2019-017065 can shorten the readout time, it is not always sufficient to realize various functions and performances required for the recent photoelectric conversion devices.

SUMMARY

According to an embodiment of the disclosure, there is provided a photoelectric conversion device including a pixel including a photoelectric conversion unit configured to output a pulse according to incidence of a photon, a counting unit including a plurality of counters each configured to count pulses output from the photoelectric conversion unit, and a calculation unit configured to perform calculation processing on a plurality of count values held by the plurality of counters, and an output line connected to the pixel, wherein the calculation unit outputs a determination value indicating a relationship between the plurality of count values, and wherein the pixel outputs a pixel signal including the determination value to the output line.

According to another embodiment of the disclosure, there is provided a photoelectric conversion device including a plurality of pixels each including a photoelectric conversion unit configured to output a pulse according to incidence of a photon, a counting unit including a plurality of counters each configured to count pulses output from the photoelectric conversion unit, a calculation unit configured to perform calculation processing on a plurality of count values output from the plurality of counters and output a determination value indicating a relationship between the plurality of count values, and a switching circuit configured to switch a signal output as a pixel signal according to the determination value, and a control circuit configured to receive pixel signals output from the plurality of pixels, wherein each of the plurality of pixels outputs the pixel signal including the determination value to the control circuit, and wherein the control circuit controls the switching circuit of the plurality of pixels according to the determination value received from the plurality of pixels.

According to still another embodiment of the disclosure, there is provided a photoelectric conversion device including a plurality of pixels each including a photoelectric conversion unit configured to output a pulse according to incidence of a photon, a counting unit including a plurality of counters each configured to count pulses output from the photoelectric conversion unit, a calculation unit configured to perform calculation processing on a plurality of count values output from the plurality of counters and outputs a determination value indicating a relationship between the plurality of count values, and a switching circuit configured to switch a signal output according to the determination value, wherein each of the plurality of pixels is configured to receive the determination value from the calculation unit of the other pixels adjacent thereto, and wherein the switching circuit selects a signal to be output as a pixel signal in accordance with the determination value output from the calculation unit of the own pixel to which it belongs and the determination values output from the calculation units of the other pixels.

Further features of the disclosure will become apparent from the following description of exemplary embodiments with reference to the attached drawings.

BRIEF DESCRIPTION OF THE DRAWINGS

FIG. 10A, FIG. 10B, FIG. 10C, and FIG. 10D are diagrams illustrating an example of an operation of a calculation unit and an output switching circuit of the photoelectric conversion device according to the second embodiment of the disclosure.

FIG. 12 is a diagram illustrating an example of an operation of an output switching circuit of the photoelectric conversion device according to the third embodiment of the disclosure.

DESCRIPTION OF THE EMBODIMENTS

Exemplary embodiments of the disclosure will now be described in detail in accordance with the accompanying drawings.

First Embodiment

Figure 1:
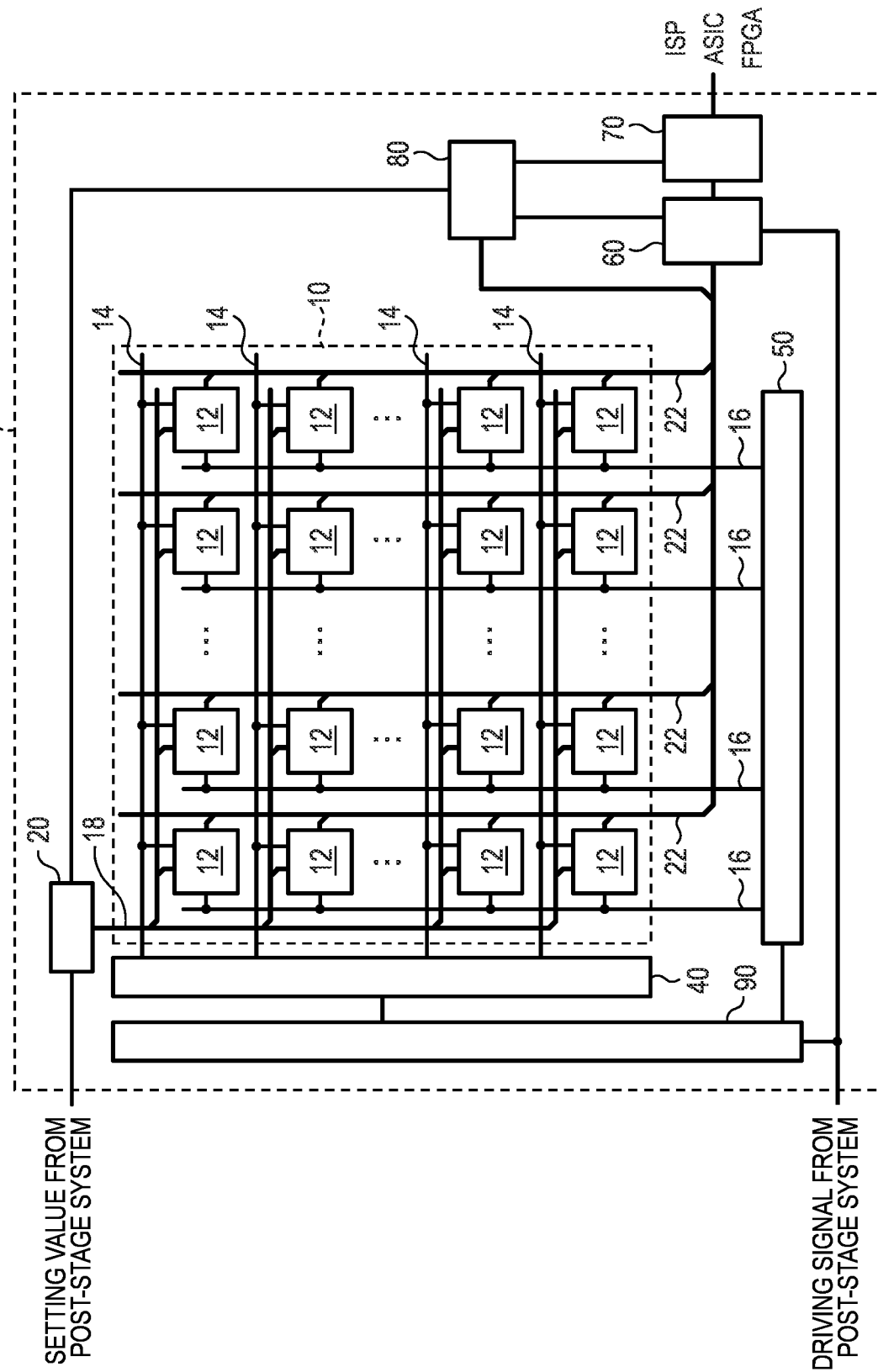
FIG. 1 is a block diagram illustrating a schematic configuration of a photoelectric conversion device according to a first embodiment of the disclosure.
Figure 2:
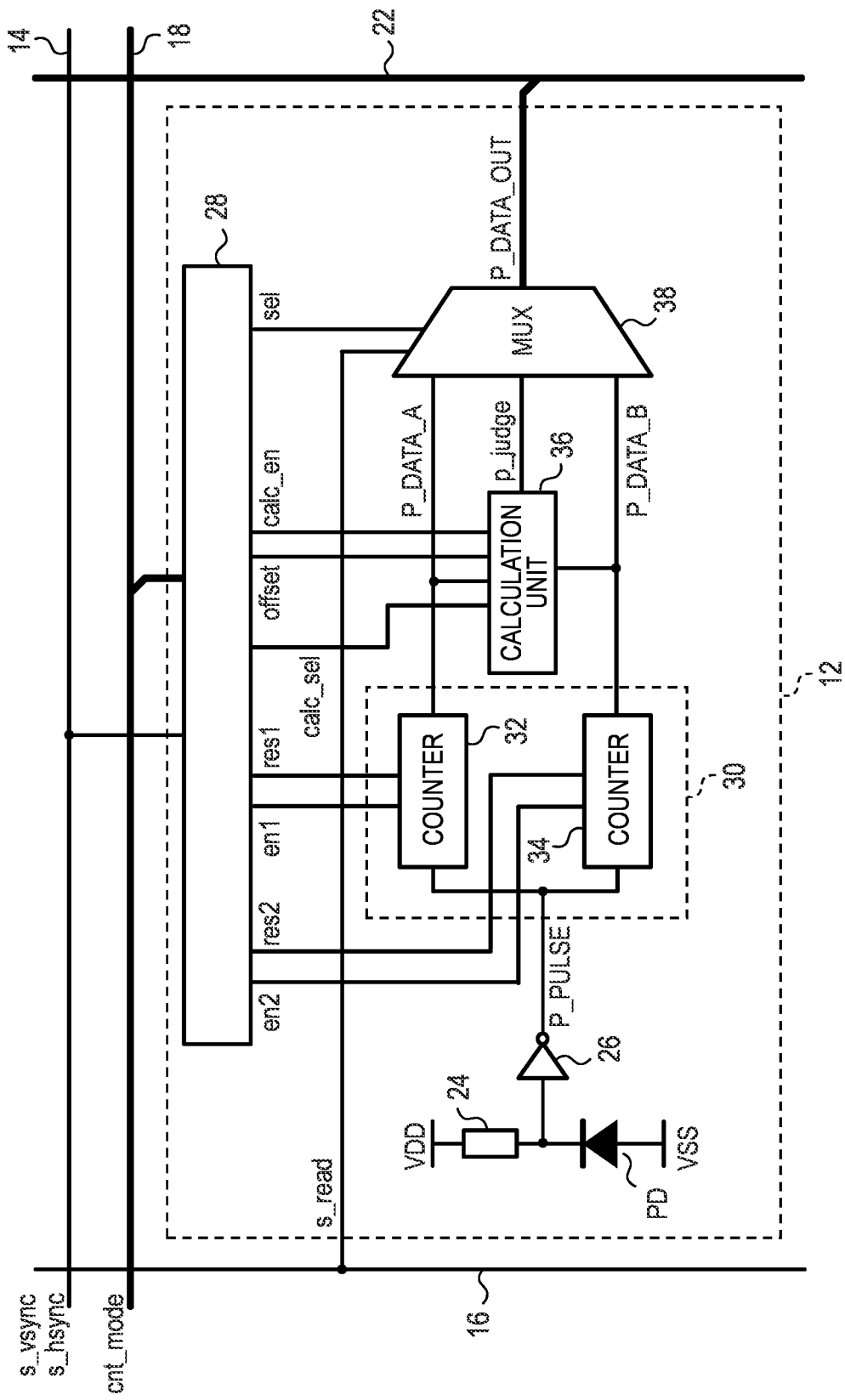
FIG. 2 is a block diagram illustrating a configuration example of a pixel in the photoelectric conversion device according to the first embodiment of the disclosure.
Figure 3A:
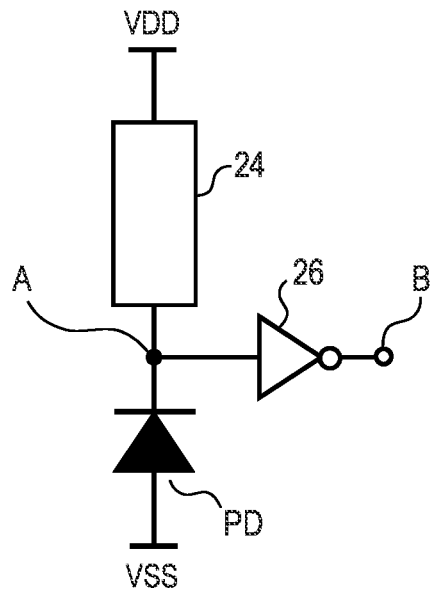
FIG. 3A, FIG. 3B, and FIG. 3C are diagrams illustrating the basic operation of a photoelectric conversion unit in the photoelectric conversion device according to the first embodiment of the disclosure.
Figure 3B:
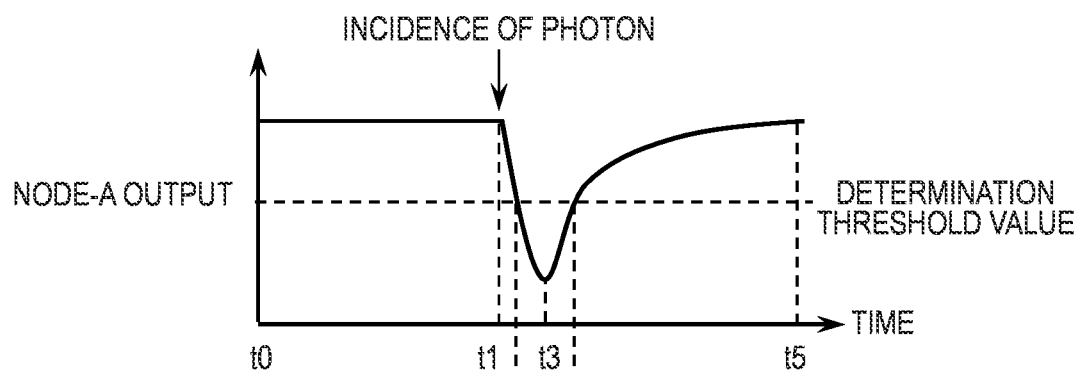
Figure 3C:
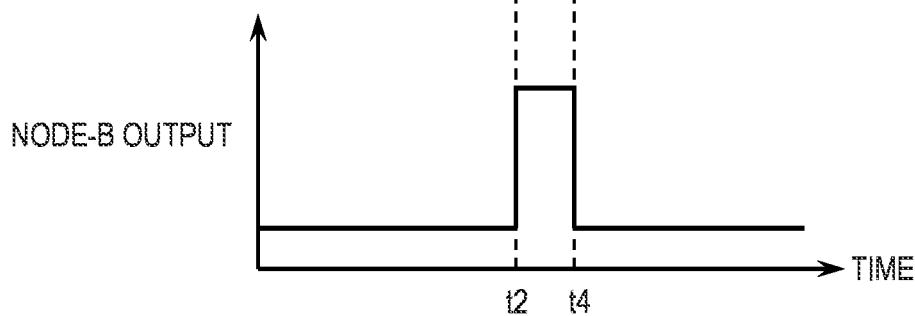
Figure 4:
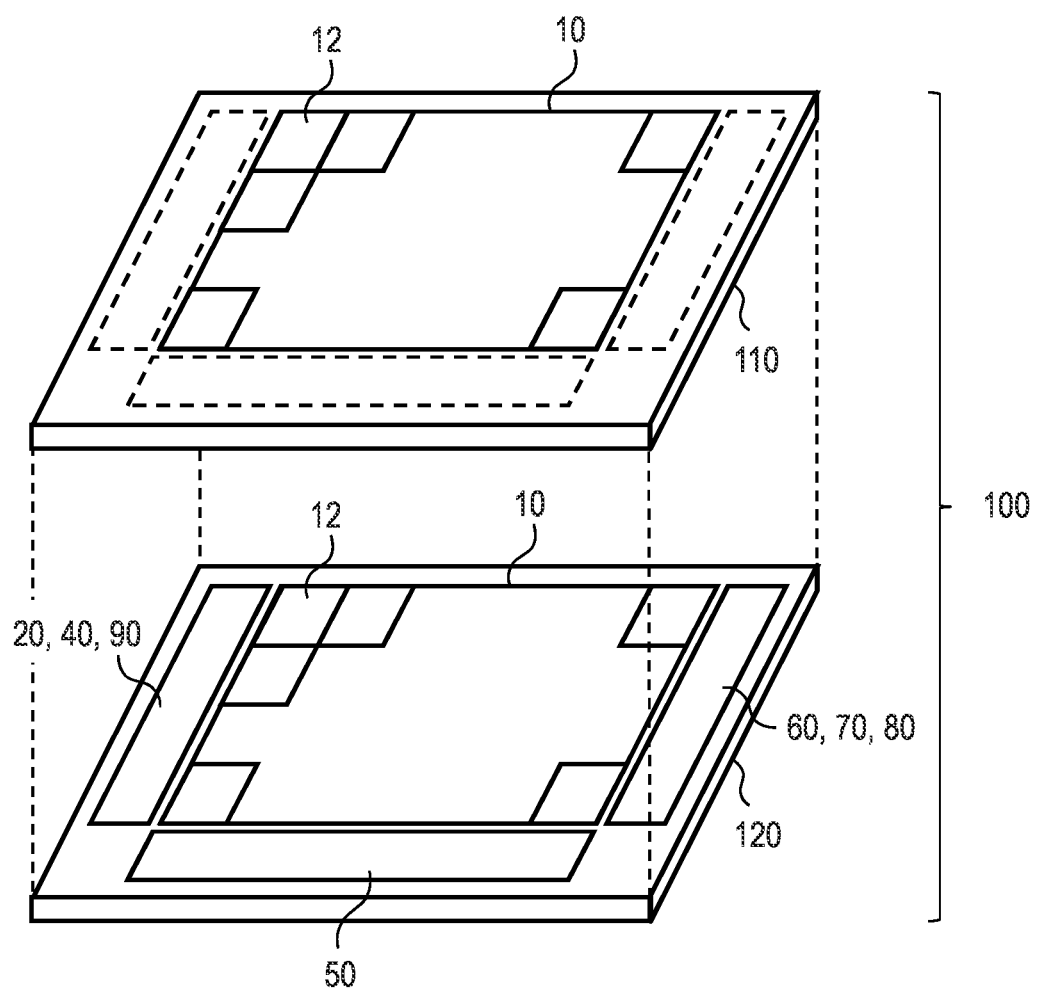
FIG. 4 is a perspective view illustrating a configuration example of the photoelectric conversion device according to the first embodiment of the disclosure.

A schematic configuration of a photoelectric conversion device according to a first embodiment of the disclosure will be described with reference to FIG. 1 to FIG. 4. FIG. 1 is a block diagram illustrating a schematic configuration of a photoelectric conversion device according to the present embodiment. FIG. 2 is a block diagram illustrating a configuration example of a pixel in the photoelectric conversion device according to the present embodiment. FIG. 3A to FIG. 3C are diagrams illustrating the basic operation of a photoelectric conversion unit in the photoelectric conversion device according to the present embodiment. FIG. 4 is a perspective view illustrating a configuration example of the photoelectric conversion device according to the present embodiment.

As illustrated in FIG. 1, the photoelectric conversion device 100 according to the present embodiment includes a pixel region 10, a register block 20, a vertical selection circuit 40, a horizontal selection circuit 50, a signal processing circuit 60, an output circuit 70, a power save control circuit 80, and a drive control circuit 90.

The pixel region 10 includes a plurality of pixels 12 arranged in an array so as to form a plurality of rows and a plurality of columns. The number of pixels 12 constituting the pixel region 10 is not particularly limited. For example, the pixel region 10 may be constituted by a plurality of pixels 12 arranged in an array of several thousands of rows and several thousands of columns as in a general digital still camera. Alternatively, the pixel region 10 may be formed of a plurality of pixels 12 arranged in one row or one column. Alternatively, one pixel 12 may constitute the pixel region 10.

In each row of the pixel array of the pixel region 10, a control line 14 is arranged extending in a first direction (lateral direction in FIG. 1). Each of the control lines 14 is connected to the pixels 12 arranged in the first direction on the corresponding row, and serves as a signal line common to these pixels 12. The first direction in which the control lines 14 extend may be denoted as a row direction or a horizontal direction. Each of the control lines 14 may include a plurality of signal lines for supplying a plurality of types of control signals to the pixels 12. The control line 14 of each row is connected to the vertical selection circuit 40.

In addition, in each column of the pixel array of the pixel region 10, a control line 16 is arranged so as to extend in a second direction (vertical direction in FIG. 1) intersecting with the first direction. Each of the control lines 16 is connected to the pixels 12 arranged in the second direction on the corresponding column, and serves as a signal line common to these pixels 12. The second direction in which the control lines 16 extend may be denoted as a column direction or a vertical direction. Each of the control lines 16 may include a plurality of signal lines for supplying a plurality of types of control signals to the pixels 12. The control line 16 of each column is connected to the horizontal selection circuit 50.

A setting signal line 18 is connected to each of the plurality of pixels 12 arranged in the pixel region 10. The setting signal line 18 may include a plurality of signal lines for supplying a plurality of kinds of signals to the pixels 12. The setting signal line 18 is connected to the register block 20.

A pixel signal output line 22 is connected to each of the plurality of pixels 12 arranged in the pixel region 10. The pixel signal output line 22 may include a plurality of signal lines for transferring a digital signal of a plurality of bits output from the pixel 12 bit by bit. The pixel signal output line 22 may be configured by a plurality of signal lines arranged in each column of the pixel array of the pixel region 10, or may be configured by a plurality of signal lines arranged in each row of the pixel array of the pixel region 10. The pixel signal output line 22 is connected to the signal processing circuit 60 and the power save control circuit 80.

The vertical selection circuit 40 is a control circuit having a function of receiving a control signal output from the drive control circuit 90, generating a control signal for driving the pixel 12, and supplying the generated control signal to the pixel 12 via the control line 14. A logic circuit such as a shift register or an address decoder be used as the vertical selection circuit 40. The vertical selection circuit 40 sequentially supplies control signals to the pixels 12 of the pixel region 10 in units of rows, and sequentially drives the pixels 12 of the pixel region 10 in units of rows. A signal supplied from the vertical selection circuit 40 to the pixel 12 via the control line 14 may include a vertical synchronization signal s_vsync and a horizontal synchronization signal s_hsync, which will be described later.

The horizontal selection circuit 50 is a control circuit having a function of receiving a control signal output from the drive control circuit 90, generating a control signal for driving the pixel 12, and supplying the generated control signal to the pixel 12 via the control line 16. A logic circuit such as a shift register or an address decoder may be used as the horizontal selection circuit 50. The horizontal selection circuit 50 sequentially scans the pixels 12 in the pixel region 10 in units of columns, and outputs the pixel signals held by the pixels 12 to the signal processing circuit 60 and the power save control circuit 80 via the pixel signal output line 22. A signal supplied from the horizontal selection circuit 50 to the pixel 12 via the control line 16 may include a readout signal s_read described later.

The register block 20 receives data from a system disposed at a post-stage of the photoelectric conversion device 100, such as ISP (Image Signal Processor), ASIC (Application Specific Integrated Circuit), FPGA (Field Programmable Gate Array). The register block 20 has a role of holding the received data as setting values of various operations of the photoelectric conversion device 100. The data communication means between the post-stage system and the register block 20 is not particularly limited, and for example, serial communication means such as I2C (Inter-Integrated Circuit) or SPI (Serial Peripheral Interface) may be applied. The register block 20 stores various settings such as timing setting of the operation of the photoelectric conversion device 100, pixel driving conditions, and setting of driving performance in the analog driving portion, and distributes them to each circuit via the setting signal line 18. In FIG. 1, for simplicity, in one embodiment, only the setting signal line 18 connecting the register block 20 and the pixel 12 is illustrated. A signal supplied from the register block 20 to the pixel 12 via the setting signal line 18 may include an operation mode setting signal cnt_mode described later.

The signal processing circuit 60 is a processing circuit that performs digital arithmetic processing such as offset processing and digital gain processing on a pixel signal input via the pixel signal output line 22. The digital arithmetic processing performed by the signal processing circuit 60 is not particularly limited, and various other digital arithmetic processing may be applied.

The output circuit 70 includes a serializer that converts parallel data into serial data and an external interface circuit, and transmits the pixel signal after digital arithmetic processing in the signal processing circuit 60 to a post-stage system such as an ISP, an ASIC, or an FPGA. As the external interface circuit, for example, SerDes (SERializer/DESerializer) transmission circuits such as LVDS (Low Voltage Differential Signaling) circuit and SLVS (Scalable Low Voltage Signaling) circuit may be applied. Note that the configuration of the output circuit 70 is not limited thereto, and may be another configuration such as a parallel output.

The power save control circuit 80 is connected to the register block 20, the signal processing circuit 60, and the output circuit 70. The power save control circuit 80 performs processing based on the pixel signals input from the pixel signal output line 22, and outputs a signal for limiting functions to the signal processing circuit 60 and the output circuit 70 to reduce power consumption as necessary. The power save control circuit 80 further has a function of generating data for setting the operation mode of the pixels 12 based on the pixel signals input from the pixel signal output line 22 and supplying the generated data to the register block 20.

The drive control circuit 90 is a control circuit for generating control signals for controlling the operations and the timings thereof of the vertical selection circuit 40, the horizontal selection circuit 50, and the like, and supplying the control signals to each circuit block. Although not illustrated in FIG. 1 for simplicity, control signals for controlling other circuit blocks other than the vertical selection circuit 40 and the horizontal selection circuit 50 is also supplied at the same time to control the overall operation of the photoelectric conversion device 100. The drive control circuit 90 may be driven by a clock signal input from the outside, or may be driven by a clock signal generated by, e.g., a PLL (Phase Locked Loop) circuit provided in the photoelectric conversion device 100.

As illustrated in FIG. 2, each pixel 12 includes a photoelectric conversion element PD, a quenching element 24, a waveform shaping unit 26, a mode switching circuit 28, a pulse counting unit 30, a calculation unit 36, and an output switching circuit 38. The pulse counting unit 30 includes two counters 32 and 34.

The photoelectric conversion element PD may be an avalanche photodiode (hereinafter referred to as "APD"). The anode of the APD constituting the photoelectric conversion element PD is connected to a node to which a voltage VSS is supplied. The cathode of the APD constituting the photoelectric conversion element PD is connected to one terminal of the quenching element 24. The other terminal of the quenching element 24 is connected to a node to which a voltage VDD higher than the voltage VSS is supplied. A connection node between the photoelectric conversion element PD and the quenching element 24 is connected to an input node of the waveform shaping unit 26. An output node of the waveform shaping unit 26 is connected to input nodes of the counters 32 and 34. The output nodes of the counters 32 and 34 are connected to input nodes of the calculation unit 36 and input nodes of the output switching circuit 38, respectively. An output node of the output switching circuit 38 is connected to the pixel signal output line 22.

The control line 14 and the setting signal line 18 are connected to a mode switching circuit 28. A vertical synchronization signal s_vsync and a horizontal synchronization signal s_hsync from the vertical selection circuit 40 are input to the mode switching circuit 28 via the control line 14. An operation mode setting signal cnt_mode from the register block 20 is input to the mode switching circuit 28 via the setting signal line 18. The control line 16 is connected to a control node of the output switching circuit 38. A readout signal s_read from the horizontal selection circuit 50 is input to the output switching circuit 38 via the control line 16.

The mode switching circuit 28 is connected to control nodes of the counters 32 and 34, the calculation unit 36, and the output switching circuit 38. The mode switching circuit 28 outputs an enable signal en1 and a counter reset signal res1 to the counter 32, and outputs an enable signal en2 and a counter reset signal res2 to the counter 34. The mode switching circuit 28 outputs the calculation enable signal calc_en, the offset signal offset, and the operation selection signal calc_sel to the calculation unit 36, and outputs the output selection signal sel to the output switching circuit 38.

The photoelectric conversion element PD may be formed of APD as described above. The voltage VSS and the voltage VDD are set such that a reverse bias voltage sufficient for the APD to perform the avalanche multiplication operation is applied. In one example, a negative high voltage is applied as the voltage VSS, and a positive voltage about a power supply voltage is applied as the voltage VDD. For example, the voltage VSS is −30 V and the voltage VDD is 1 V. By supplying a reverse bias voltage sufficient to perform the avalanche multiplication operation to the APD, charge generated by light incidence to the APD cause avalanche multiplication, and an avalanche current is generated. The operation modes in a state where a reverse bias voltage is supplied to the APD include a Geiger mode and a linear mode. The Geiger mode is an operation mode in which a voltage applied between the anode and the cathode is set to a reverse bias voltage larger than a breakdown voltage of the APD. The linear mode is an operation mode in which a voltage applied between an anode and a cathode is set to a reverse bias voltage close to or lower than the breakdown voltage of the APD. The APD operating in the Geiger mode is called SPAD (Single Photon Avalanche Diode). The APD constituting the photoelectric conversion element PD may operate in the linear mode or the Geiger mode.

The quenching element 24 has a function of converting a change in the avalanche current generated in the photoelectric conversion element PD into a voltage signal. Further, the quenching element 24 functions as a load circuit (quenching circuit) at the time of signal multiplication by avalanche multiplication, and has a function of reducing a voltage applied to the photoelectric conversion element PD to suppress avalanche multiplication. The operation in which the quenching element 24 suppresses avalanche multiplication is called a quenching operation. Further, the quenching element 24 has a function of returning the voltage supplied to the photoelectric conversion element PD to the voltage VDD by passing a current corresponding to the voltage drop by the quenching operation. The operation in which the quenching element 24 returns the voltage supplied to the photoelectric conversion element PD to the voltage VDD is called a recharging operation. The quenching element 24 may comprise one or more MOS transistors or resistors such as diffusion resistors.

The waveform shaping unit 26 has a function of converting an analog signal supplied from the photoelectric conversion element PD into a pulse signal (signal P_PULSE). The waveform shaping unit 26 may be configured by a logic circuit including a NOT circuit (inverter circuit), a NOR circuit, a NAND circuit, and the like. The output node of the waveform shaping unit 26 is connected to the pulse counting unit 30. The signal P_PULSE output from the waveform shaping unit 26 is input to the counter 32 and the counter 34 of the pulse counting unit 30.

FIG. 3A to FIG. 3C are diagrams illustrating the basic operation of a photoelectric conversion unit including the photoelectric conversion element PD, the quenching element 24, and the waveform shaping unit 26. FIG. 3A is a circuit diagram of the photoelectric conversion unit, FIG. 3B illustrates a waveform of a signal at an input node (node A) of the waveform shaping unit 26, and FIG. 3C illustrates a waveform of a signal at an output node (node B) of the waveform shaping unit 26. Here, for simplicity of explanation, it is assumed that the waveform shaping unit 26 is configured by an inverter circuit.

At time t0, a reverse bias voltage of a potential difference corresponding to (VDD-VSS) is applied to the photoelectric conversion element PD. Although a reverse bias voltage sufficient to cause avalanche multiplication is applied between the anode and the cathode of the APD constituting the photoelectric conversion element PD, there is no carrier that becomes a seed of avalanche multiplication in a state where photons are not incident on the photoelectric conversion element PD. Therefore, no avalanche multiplication occurs in the photoelectric conversion element PD, and no current flows through the photoelectric conversion element PD.

At time t1, it is assumed that a photon enters the photoelectric conversion element PD. When a photon is incident on the photoelectric conversion element PD, an electron-hole pair is generated by photoelectric conversion, avalanche multiplication is generated using these carriers as a seed, and an avalanche multiplication current flows through the photoelectric conversion element PD. When the avalanche multiplication current flows through the quenching element 24, a voltage drop by the quenching element 24 occurs, and the voltage of the node A begins to drop. When the voltage drop amount of the node A increases and the avalanche multiplication stops at time t3, the voltage level of the node A does not drop any further.

When the avalanche multiplication in the photoelectric conversion element PD stops, a current that compensates the voltage drop flows from the node to which the voltage VSS is supplied to the node A through the photoelectric conversion element PD, and the voltage of the node A gradually increases. Then, at time t5, node A is settled to the original voltage level.

The waveform shaping unit 26 binarizes the signal input from the node A according to a predetermined determination threshold value, and outputs the signal from the node B. Specifically, the waveform shaping unit 26 outputs a low-level signal from the node B when the voltage level of the node A exceeds the determination threshold value, and outputs a high-level signal from the node B when the voltage level of the node A is equal to or lower than the determination threshold value. For example, as illustrated in FIG. 3B, it is assumed that the voltage of the node A is equal to or lower than the determination threshold value during a period from time t2 to time t4. In this case, as illustrated in FIG. 3C, the signal level at the node B becomes low-level during the period from the time t0 to the time t2, and during the period from the time t4 to the time t5, and becomes high-level during the period from the time t2 to the time t4.

In this manner, the analog signal input from the node A is shaped into a digital signal by the waveform shaping unit 26. A pulse signal output from the waveform shaping unit 26 in response to incidence of a photon on the photoelectric conversion element PD is a photon detection pulse signal.

The mode switching circuit 28 has a function of setting an operation mode of the pixel 12, and generates control signals for controlling the pulse counting unit 30, the calculation unit 36, and the output switching circuit 38 in accordance with signals from the vertical selection circuit 40 and the register block 20. Specifically, the mode switching circuit 28 receives the vertical synchronization signal s_vsync and the horizontal synchronization signal s_hsync from the vertical selection circuit 40, and receives the operation mode setting signal cnt_mode from the register block 20. The mode switching circuit 28 dynamically generates the enable signals en1, en2, the calculation enable signal calc_en, the counter reset signals res1, res2, the offset signal offset, the operation selection signal calc_sel, and the output selection signal sel according to these signals. The enable signal en1 and the counter reset signal res1 are input to the counter 32. The enable signal en2 and the counter reset signal res2 are input to the counter 34. The calculation enable signal calc_en, the offset signal offset, and the operation selection signal calc_sel are input to the calculation unit 36. The output selection signal sel is input to the output switching circuit 38.

The counter 32 is valid when the enable signal en1 is at a predetermined level (for example, high-level), counts the number of pulses to be superimposed on the signal P_PULSE output from the waveform shaping unit 26, and outputs a signal P_DATA_A indicating the count value of the pulses. The count value held by the counter 32 is reset when the counter reset signal res1 becomes a predetermined level (for example, high-level). Similarly, the counter 34 is valid when the enable signal en2 is at a predetermined level (for example, high-level), counts the number of pulses to be superimposed on the signal P_PULSE output from the waveform shaping unit 26, and outputs a signal P_DATA_B indicating the count value of the pulses. The count value held by the counter 34 is reset when the counter reset signal res2 becomes a predetermined level (for example, high-level). The signal P_DATA_A output from the counter 32 and the signal P_DATA_B output from the counter 34 are input to the calculation unit 36 and the output switching circuit 38.

The calculation unit 36 performs predetermined calculation processing on the signal P_DATA_A and the signal P_DATA_B according to the offset signal offset, the operation selection signal calc_sel, and the calculation enable signal calc_en, and outputs a signal p_judge indicating the operation result. The signal p_judge is, for example, a 1-bit signal indicating whether or not the signal P_DATA_A and the signal P_DATA_B satisfy a predetermined relationship. In this specification, a value of 1 or 0 indicated by the signal p_judge may be referred to as a "determination value". The calculation unit 36 is enabled when the calculation enable signal calc_en is at a predetermined level (for example, high-level), and outputs a signal p_judge, which is an operation result of the signal P_DATA_A and the signal P_DATA_B. The operation selection signal calc_sel is a signal for selecting an operation content in the calculation unit 36. The operation content of the calculation unit 36 is not particularly limited, but here, it is determined whether or not the difference (absolute value) between the count value indicated by the signal P_DATA_A and the count value indicated by the signal P_DATA_B is equal to or greater than the value of the offset signal offset. According to this calculation, information on the magnitude of the change in the count value between frames of each pixel 12 may be obtained from the signal p_judge. The signal p_judge obtained by the calculation unit 36 is input to the output switching circuit 38.

The output switching circuit 38 is configured to be able to output any one of the signals P_DATA_A, P_DATA_B, and p_judge, or a combination thereof, according to the output selection signal sel. The readout signal s_read supplied from the horizontal selection circuit 50 via the control line 16 is a signal for controlling the output of a signal from the output switching circuit 38 to the pixel signal output line 22.

The photoelectric conversion device 100 according to the present embodiment may be formed on one substrate, or may be formed as a stacked-type photoelectric conversion device in which a plurality of substrates is stacked. In the latter case, for example, as illustrated in FIG. 4, the sensor substrate 110 and the circuit substrate 120 may be stacked and electrically connected to each other to form a stacked-type photoelectric conversion device. At least the photoelectric conversion element PD among the constituent elements of the pixel 12 may be arranged on the sensor substrate 110. In addition, among the constituent elements of the pixel 12, other constituent elements than the photoelectric conversion element PD may be arranged on the circuit substrate 120. The element arranged on the sensor substrate 110 and the element arranged on the circuit substrate 120 may be electrically connected to each other via an interconnection provided for each pixel 12. The circuit substrate 120 may further include a register block 20, a vertical selection circuit 40, a horizontal selection circuit 50, a signal processing circuit 60, an output circuit 70, a power save control circuit 80, a drive control circuit 90, and the like.

The photoelectric conversion element PD of each pixel 12 and other components may be provided on the sensor substrate 110 and the circuit substrate 120 so as to overlap each other in a plan view. The register block 20, the vertical selection circuit 40, the horizontal selection circuit 50, the signal processing circuit 60, the output circuit 70, the power save control circuit 80, and the drive control circuit 90 may be arranged around the pixel region 10 formed by the plurality of pixels 12. Here, the "plan view" refers to a view from a direction perpendicular to the surface of the sensor substrate 110.

By configuring the stacked-type photoelectric conversion device 100, the degree of integration of elements may be increased and high functionality may be achieved. In particular, by disposing the photoelectric conversion element PD and the other components of the pixel 12 on different substrates, the photoelectric conversion element PD may be disposed at high density without sacrificing the light receiving area of the photoelectric conversion element PD, and the photon detection efficiency may be improved.

The number of substrates constituting the photoelectric conversion device 100 is not limited to two, and three or more substrates may be stacked to form the photoelectric conversion device 100.

Although FIG. 4 assumes a chip diced as the sensor substrate 110 and the circuit substrate 120, the sensor substrate 110 and the circuit substrate 120 are not limited to the chip. For example, each of the sensor substrate 110 and the circuit substrate 120 may be a wafer. In addition, the sensor substrate 110 and the circuit substrate 120 may be stacked in a wafer state and then diced, or may be stacked and bonded after the sensor substrate 110 and the circuit substrate 120 are formed into chips.

Next, an operation example of the photoelectric conversion device according to the present embodiment will be described with reference to FIG. 5 to FIG. 7. In the photoelectric conversion device according to the present embodiment, each pixel 12 includes two counters 32 and 34, and count values acquired in two different frames may be simultaneously held in the counters 32 and 34. Thereby, the change in count value between frames may be easily acquired by the calculation processing in the calculation unit 36, and the acquired information may be used for setting the operation mode.

Figure 5:
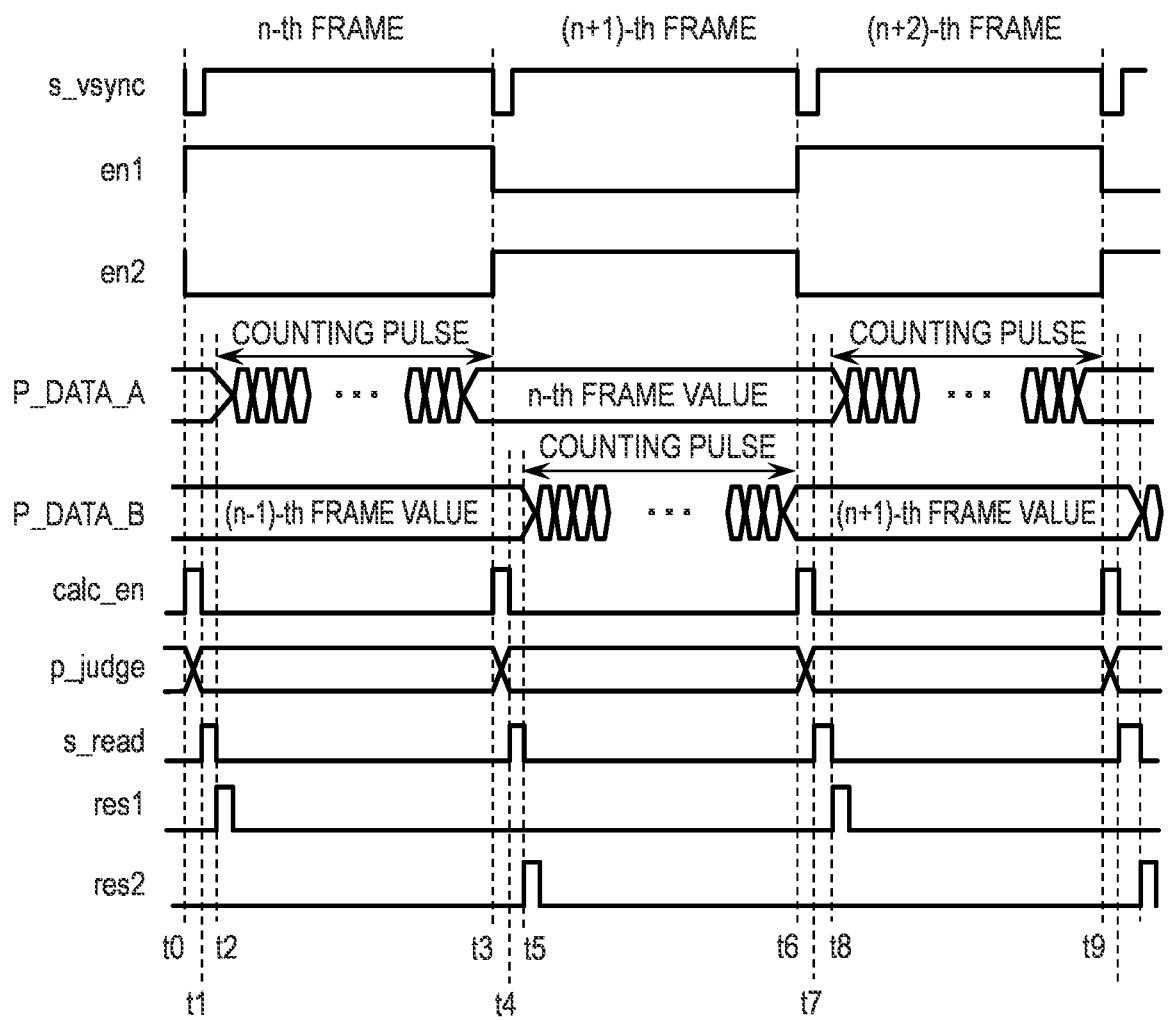
FIG. 5 is a timing chart illustrating an operation example of the photoelectric conversion device according to the first embodiment of the disclosure.

FIG. 5 is a timing chart illustrating an operation example of the photoelectric conversion device according to the present embodiment. FIG. 5 illustrates the waveforms of the vertical synchronization signal s_vsync, the enable signals en1 and en2, the calculation enable signal calc_en, the readout signal s_read, and the counter reset signals res1 and res2, and the values of the signals P_DATA_A, P_DATA_B, afnd p_judge. The vertical synchronization signal s_vsync is an internal synchronization signal synchronized with the operation of one frame.

FIG. 5 illustrates the operation for three frames from the n-th frame to the (n+2)-th frame. In the n-th frame and the (n+2)-th frame, the enable signal en1 is at high-level, i.e., the counter 32 is valid, and in the (n+1)-th frame, the enable signal en2 is at high-level, i.e., the counter 34 is valid. In addition, it is assumed that the enable signal en2 is at high-level in the (n−1)-th frame (not illustrated), that is, the counter 34 is valid, and the enable signal en1 is at high-level in the (n−2)-th frame (not illustrated), that is, the counter 32 is valid.

At time t0, the vertical synchronization signal s_vsync transitions from high-level to low-level, and the operation of the n-th frame is started. At the time t0, the count value of the (n−2)-th frame is held in the counter 32, and the count value of the (n−1)-th frame is held in the counter 34. The mode switching circuit 28 controls the calculation enable signal calc_en from low-level to high-level in accordance with the vertical synchronization signal s_vsync and the operation mode setting signal cnt_mode. Thus, the calculation unit 36 performs a calculation between the signals P_DATA_A and P_DATA_B, and outputs a signal p_judge as a result of the calculation.

At the subsequent time t1, the readout signal s_read supplied from the horizontal selection circuit 50 to the output switching circuit 38 transitions from low-level to high-level. In response to the output selection signal sel supplied from the mode switching circuit 28, the output switching circuit 38 outputs, to the pixel signal output line 22, any one of the signals P_DATA_A, P_DATA_B, and p_judge or a combination thereof.

At the subsequent time t2, the counter reset signal res1 supplied from the mode switching circuit 28 to the counter 32 transitions from low-level to high-level, and the count value of the counter 32 is reset. After the counter reset signal res1 returns to low-level, the counter 32 starts counting pulses superimposed on the signal P_PULSE. On the other hand, the n-th frame is a period in which the enable signal en2 is at low-level, and the counter 34 holds the count value in the (n−1)-th frame as it is.

At the subsequent time t3, the vertical synchronization signal s_vsync transitions from high-level to low-level, and the operation of the (n+1)-th frame is started. At the time t3, the count value of the n-th frame is held in the counter 32, and the count value of the (n−1)-th frame is held in the counter 34. The mode switching circuit 28 controls the calculation enable signal calc_en from low-level to high-level in accordance with the vertical synchronization signal s_vsync and the operation mode setting signal cnt_mode. Thus, the calculation unit 36 performs a calculation between the signals P_DATA_A and P_DATA_B, and outputs a signal p_judge as a result of the calculation.

At the subsequent time t4, the readout signal s_read supplied from the horizontal selection circuit 50 to the output switching circuit 38 transitions from low-level to high-level. In response to the output selection signal sel supplied from the mode switching circuit 28, the output switching circuit 38 outputs, to the pixel signal output line 22, any one of the signals P_DATA_A, P_DATA_B, and p_judge or a combination thereof.

At the subsequent time t5, the counter reset signal res2 supplied from the mode switching circuit 28 to the counter 32 transitions from low-level to high-level, and the count value of the counter 34 is reset. After the counter reset signal res2 returns to low-level, the counter 34 starts counting pulses superimposed on the signal P_PULSE. On the other hand, the (n+1)-th frame is a period during which the enable signal en1 is at low-level, and the counter 32 holds the count value in the n-th frame as it is.

At the subsequent time t6, the vertical synchronization signal s_vsync transitions from high-level to low-level, and the operation of the (n+2)-th frame is started. At the time t6, the count value of the n-th frame is held in the counter 32, and the count value of the (n+1)-th frame is held in the counter 34. The mode switching circuit 28 controls the calculation enable signal calc_en from low-level to high-level in accordance with the vertical synchronization signal s_vsync and the operation mode setting signal cnt_mode. Thus, the calculation unit 36 performs a calculation between the signals P_DATA_A and P_DATA_B, and outputs a signal p_judge as a result of the calculation.

At the subsequent time t7, the readout signal s_read supplied from the horizontal selection circuit 50 to the output switching circuit 38 transitions from low-level to high-level. In response to the output selection signal sel supplied from the mode switching circuit 28, the output switching circuit 38 outputs, to the pixel signal output line 22, any one of the signals P_DATA_A, P_DATA_B, and p_judge or a combination thereof.

At the subsequent time t8, the counter reset signal res1 supplied from the mode switching circuit 28 to the counter 32 transitions from low-level to high-level, and the count value of the counter 32 is reset. After the counter reset signal res1 returns to low-level, the counter 32 starts counting pulses superimposed on the signal P_PULSE. On the other hand, the (n+2)-th frame is a period during which the enable signal en2 is at low-level, and the counter 34 holds the count value in the (n+1)-th frame as it is. After the subsequent time t9, the same processing as the processing after the time t3 is repeated.

FIG. 6A to FIG. 6D are diagrams illustrating an example of the data format of the signal P_DATA_OUT output from the output switching circuit 38. The signal P_DATA_OUT output from the output switching circuit 38 is controlled by the output selection signal sel from the mode switching circuit 28 and the readout signal s_read from the horizontal selection circuit 50. Here, as an example, it is assumed that the signal P_DATA_OUT is 10-bit data. In each of FIG. 6A to FIG. 6D, the lowest block represents the least significant bit, and the highest block represents the most significant bit.

Figure 6A:
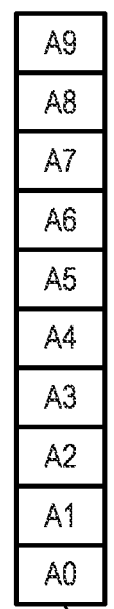
FIG. 6A, FIG. 6B, FIG. 6C, and FIG. 6D illustrate examples of data formats of a signal output from an output switching circuit of the photoelectric conversion device according to the first embodiment of the disclosure.

FIG. 6A illustrates the signal P_DATA_OUT when the signal P_DATA_A is selected by the output switching circuit 38. In this case, the count value of the counter 32 (signal P_DATA_A), which does not include the calculation result of the calculation unit 36, is output as it is from the pixel 12, and a high-gradation image may be obtained. The same applies when the signal P_DATA_B is selected by the output switching circuit 38.

Figure 6B:
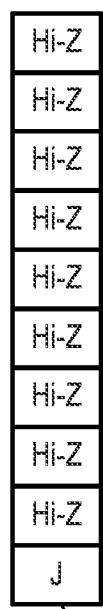

FIG. 6B illustrates the signal P_DATA_OUT when the signal p_judge is selected by the output switching circuit 38. Here, the determination value of one bit indicated by the signal p_judge is represented as data J. The data J is output as, for example, the least significant bit data of the signal P_DATA_OUT. The output nodes of the other bits of the output switching circuit 38 are set in a high impedance state (Hi-Z). Although the output nodes of the other bits of the output switching circuit 38 are in the high impedance state here, the values of the other bits of the signal P_DATA_OUT may be 0.

Figure 6C:
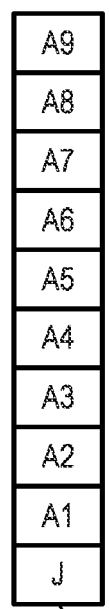

FIG. 6C illustrates the signal P_DATA_OUT when the signal P_DATA_A and the signal p_judge are selected by the output switching circuit 38. In this case, for example, data obtained by adding 1-bit data J to the upper 9-bit data of the signal P_DATA_A is output as the signal P_DATA_OUT. That is, from the signal P_DATA_OUT, both the image information and the calculation result may be obtained.

Figure 6D:
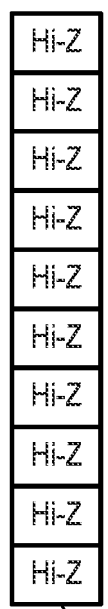

FIG. 6D illustrates the output state of the output switching circuit 38 when the readout signal s_read is not valid. When the readout signal s_read is not valid, in one embodiment, the output node of each bit of the output switching circuit 38 is in a high impedance state. By setting the output node of each bit of the output switching circuit 38 to the high impedance state when reading out a signal from another pixel 12 sharing the pixel signal output line 22, it is possible to prevent data competition at the pixel signal output line 22.

Figure 7:
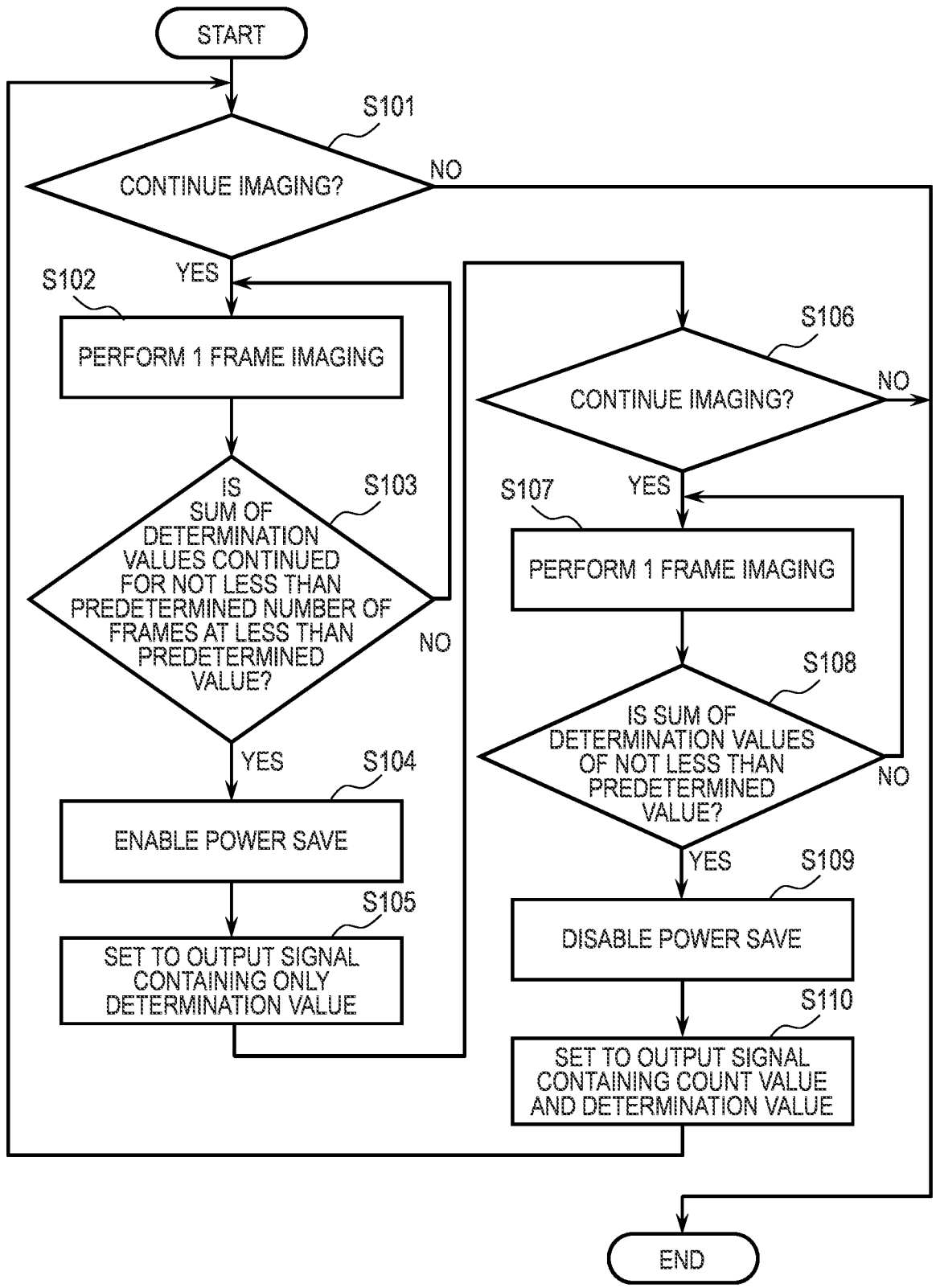
FIG. 7 is a flowchart illustrating an operation example of the photoelectric conversion device according to the first embodiment of the disclosure.

FIG. 7 is a flowchart illustrating an operation example of the photoelectric conversion device according to the present embodiment. The photoelectric conversion device according to the present embodiment may be operated, for example, in accordance with the procedure described in steps S101 to S110 in FIG. 7.

First, in step S101, it is determined whether or not to continue the imaging operation based on whether or not the driving signal from the post-stage system is continuously supplied. As a result of the determination, when the driving signal from the post-stage system is not continued ("NO" in step S101), it is determined that the imaging operation is terminated, and the series of processing ends. As a result of the determination, when the driving signal from the post-stage system continues ("YES" in step S101), it is determined that the imaging operation continues, and the process proceeds to step S102.

Next, in step S102, imaging of one frame is performed. At this time, the output switching circuit 38 of each pixel 12 is set to output a signal P_DATA_OUT including data of the signal P_DATA_A and data of the signal p_judge. After the imaging, the process proceeds to step S103.

Next, in step S103, the power save control circuit 80 determines whether or not the sum of the determination values (the signals p_judge) output from the plurality of pixels 12 in the pixel region 10 is less than a predetermined value and is continuous over a predetermined number of frames or more. As a result of the determination, when the sum of the determination values is less than the predetermined value and is not continuous over the predetermined number of frames or more ("NO" in step S103), the process returns to step S102 to perform imaging of the next frame. As a result of the determination, when the sum of the determination values is less than the predetermined value and is continuously equal to or greater than the predetermined number of frames ("YES" in step S103), the process proceeds to step S104.

The signal p_judge, which is the calculation result of the calculation unit 36, includes information on a change in count value between frames in each pixel 12. For example, the value of the signal p_judge of the pixel 12 having a large change in count value between frames may be 1, and the value of the signal p_judge of the pixel 12 having a small change in count value between frames may be 0. In step S103, first, the determination values output from the plurality of pixels 12 in the pixel region 10 are summed, and it is determined whether or not the sum of the determination values is less than a predetermined value. The predetermined value at this time is not particularly limited, but may be set to, for example, a value corresponding to half the number of the pixels 12 constituting the pixel region 10. The predetermined value is supplied from the mode switching circuit 28 to the calculation unit 36 as an offset signal offset. When the sum of the determination values is less than the predetermined value, it is further determined whether or not a state in which the sum of the determination values is less than the predetermined value continues for a predetermined period or longer. The predetermined period in this case is not particularly limited, but may be set to, for example, 10 frames. In other words, the power save control circuit 80 functions to aggregate the pixels 12 whose count values change largely between frames.

Next, in step S104, the power save control circuit 80 enables power save in the signal processing circuit 60 and the output circuit 70. Specifically, power consumption is reduced by limiting functions of the signal processing circuit 60 and the output circuit 70 based on a signal from the power save control circuit 80. After the power save is enabled, the process proceeds to step S105.

Next, in step S105, the output selection signal sel is set so that the output switching circuit 38 of each pixel 12 outputs a pixel signal including the data of the determination value (corresponding to the signal P_DATA_OUT described in FIG. 6B) according to the enabling of the power save. Specifically, the operation mode setting signal cnt_mode output from the register block 20 is set according to the setting signal output from the power save control circuit 80. The mode switching circuit 28 is controlled according to the setting signal cnt_mode output from the register block 20, and the output selection signal sel is set so as to output a pixel signal including data of the determination value. After setting the output selection signal sel, the process proceeds to step S106.

Next, in step S106, it is determined whether or not to continue the imaging operation based on whether or not the driving signal from the post-stage system is continuously supplied. As a result of the determination, when the driving signal from the post-stage system is not continued ("NO" in step S106), it is determined that the imaging operation is terminated, and the series of processing ends. As a result of the determination, when the driving signal from the post-stage system continues ("YES" in step S106), it is determined that the imaging operation continues, and the process proceeds to step S107.

Next, in step S107, imaging of one frame is performed. After the imaging, the process proceeds to step S108.

Next, in step S108, the power save control circuit 80 determines whether or not the sum of the determination values (the signals p_judge) output from the plurality of pixels 12 in the pixel region 10 is equal to or greater than a predetermined value. As a result of the determination, when the sum of the determination values is less than the predetermined value ("NO" in step S108), the process returns to step S107 to perform imaging of the next frame. As a result of the determination, when the sum of the determination values is equal to or greater than the predetermined value ("YES" in step S108), the process proceeds to step S109. The method of calculating the sum of the determination values may be similar to that in step S103.

Next, in step S109, the power save control circuit 80 disables the power save in the signal processing circuit 60 and the output circuit 70. Specifically, the functions of the signal processing circuit 60 and the output circuit 70 are returned to the normal state based on a signal from the power save control circuit 80, and normal image data is transmitted to the ISP, ASIC, FPGA, or the like in the post-stage. After the power save is invalidated, the process proceeds to step S110.

Next, in step S110, the output selection signal sel is set so that the output switching circuit 38 of each pixel 12 outputs a pixel signal including data of a count value and a determination value (corresponding to the signal P_DATA_OUT described in FIG. 6C) in response to invalidation of power saving. Specifically, the operation mode setting signal cnt_mode output from the register block 20 is set according to the setting signal output from the power save control circuit 80. The mode switching circuit 28 is controlled according to the setting signal cnt_mode output from the register block 20, and the output selection signal sel is set so as to output a pixel signal including data of a count value and a determination value. After setting the output selection signal sel, the process proceeds to step S101.

As described above, in the photoelectric conversion device according to the present embodiment, each pixel 12 includes the calculation unit 36 that calculates a change in count value between frames, and the calculation result by the calculation unit 36 may be output from each pixel 12 as image information. The power save control circuit 80 distributes a signal for reducing power to functional blocks in the photoelectric conversion device based on the image information, whereby a photoelectric conversion device with low power consumption and high functionality may be realized.

As described above, according to the present embodiment, it is possible to realize a photoelectric conversion device with higher functionality and higher performance.

Second Embodiment

A schematic configuration of a photoelectric conversion device according to a second embodiment of the disclosure will be described with reference to FIG. 8 to FIG. 10D. Components similar to those of the photoelectric conversion device according to the first embodiment are denoted by the same reference numerals, and description thereof will be omitted or simplified.

In the present embodiment, a photoelectric conversion device mainly aiming at obtaining an image with reduced blinking defect is described. The blinking defect is mainly caused by crystal defects of a semiconductor, and indicates a decrease in image quality caused by a phenomenon in which an output signal of the pixel 12 rarely takes a value far from an actual number of incident photons. In order to obtain a high-quality image, in one embodiment, the blinking defect by correction is removed, and the correction processing is mainly performed in a system in a post-stage such as an ISP, an ASIC, or an FPGA. However, in the correction of the blinking defect, when the intensity of the correction is too high, there are disadvantages that the sharpness of an image is decreased or the power of a circuit used for the correction is excessively consumed.

In the present embodiment, the determination value of the signal p_judge is used as information indicating whether or not the blinking defect is detected, and the determination value may be transmitted to a system in a post-stage via the pixel signal output line 22, the signal processing circuit 60, and the output circuit 70 together with the image data. The system in the post-stage may reduce power consumption by reducing the intensity of the defect correction by obtaining information as to whether or not each pixel 12 has detected the blinking defect.

Figure 8:
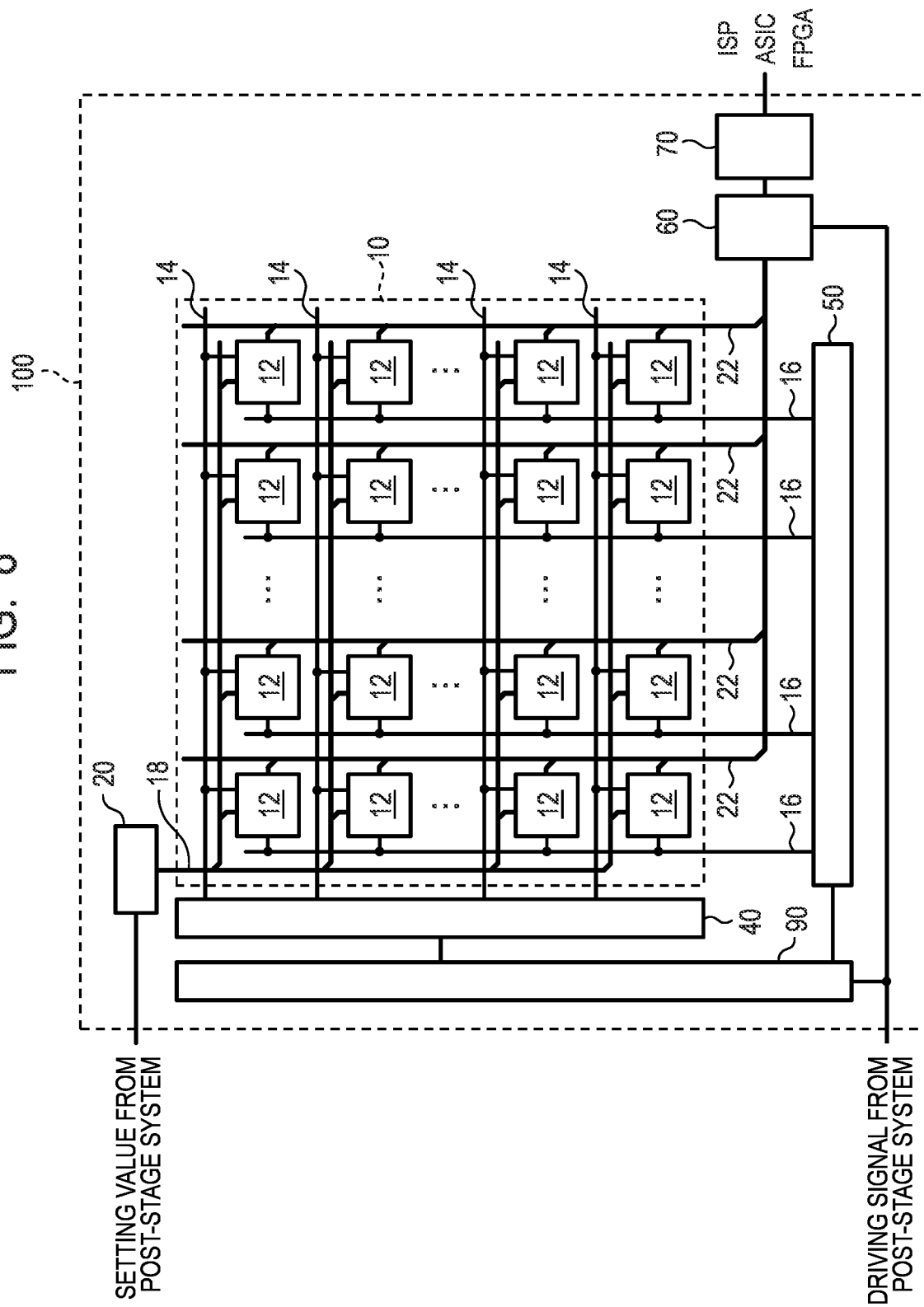
FIG. 8 is a block diagram illustrating a schematic configuration of a photoelectric conversion device according to a second embodiment of the disclosure.

FIG. 8 is a block diagram illustrating a schematic configuration of the photoelectric conversion device according to the present embodiment. The photoelectric conversion device 100 according to the present embodiment is different from the photoelectric conversion device according to the first embodiment in that the photoelectric conversion device 100 does not include the power save control circuit 80 as illustrated in FIG. 8. Although the power save control circuit 80 is not provided because attention is paid to the reduction of blinking defect in the present embodiment, the same function as that of the first embodiment may be provided by adding the power save control circuit 80.

Figure 9:
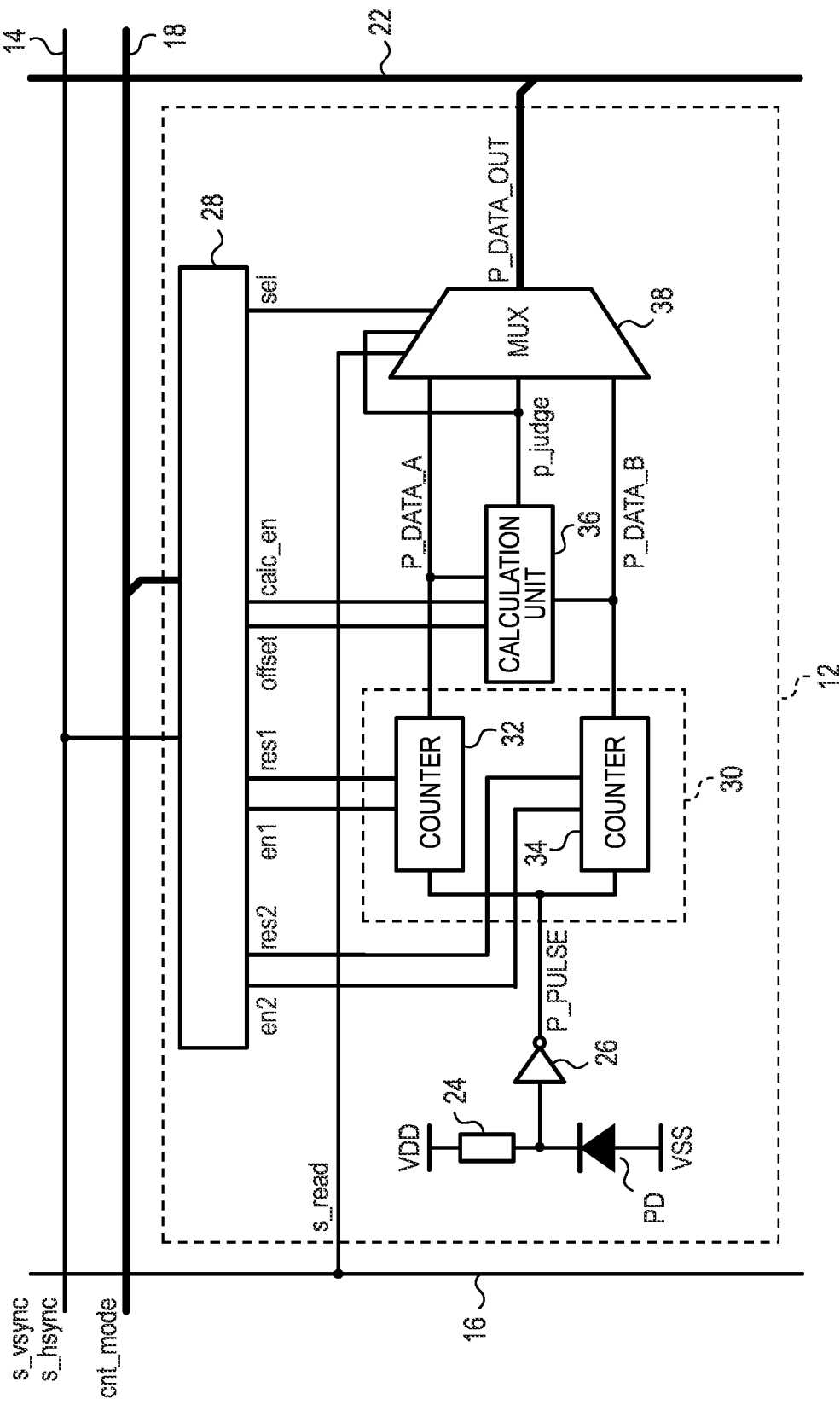
FIG. 9 is a block diagram illustrating a configuration example of a pixel in the photoelectric conversion device according to the second embodiment of the disclosure.

FIG. 9 is a block diagram illustrating a configuration example of the pixel 12 in the photoelectric conversion device according to the present embodiment. In the pixel 12 of the photoelectric conversion device according to the present embodiment, as illustrated in FIG. 9, the signal p_judge output from the calculation unit 36 is used not only as a data input of the output switching circuit 38 but also as a signal for selecting a signal output from the output switching circuit 38.

FIG. 10A to FIG. 10D are diagrams illustrating an example of calculations of the calculation unit 36 and the output switching circuit 38 in the photoelectric conversion device according to the present embodiment. FIG. 10A illustrates the calculation of the calculation unit 36, and FIG. 10B illustrates the calculation of the output switching circuit 38. FIG. 10C and FIG. 10D illustrate data configuration examples of the signal P_DATA_OUT output from the output switching circuit 38.

The calculation unit 36 compares the difference between the count value of the n-th frame and the count value of the (n−1)-th frame with the offset value offset (see FIG. 10A). For example, at time t3 in the timing chart of FIG. 5, the signal P_DATA_A has a count value in the n-th frame, and the signal P_DATA_B has a count value in the (n−1)-th frame. When the difference between the count value in the n-th frame and the count value in the (n−1)-th frame is equal to or greater than the offset value offset, i.e., when it is determined that the blinking defect is occurring, the calculation unit 36 outputs the signal p_judge of the determination value 1. Alternatively, when the difference between the count value in the n-th frame and the count value in the (n−1)-th frame is less than the offset value offset, i.e., when it is determined that the blinking defect is not caused, the calculation unit 36 outputs the signal p_judge of the determination value 0.

The output switching circuit 38 generates the output signal P_DATA_OUT based on the value indicated by the signal p_judge (see FIG. 10B). That is, when the count value of the n-th frame is given by the signal P_DATA_A and the determination value is 1, it is determined that the signal P_DATA_A is being influenced by the blinking defect, and the output data B is selected as the signal P_DATA_OUT. When the count value of the n-th frame is given by the signal P_DATA_A and the determination value is 0, it is determined that the signal P_DATA_A is not being influenced by the blinking defect, and the output data A is selected as the signal P_DATA_OUT. In the case where the count value of the n-th frame is given by the signal P_DATA_B and the determination value is 1, it is determined that the signal P_DATA_B is being influenced by the blinking defect, and the output data A is selected as the signal P_DATA_OUT. In the case where the count value of the n-th frame is given by the signal P_DATA_B and the determination value is 0, it is determined that the signal P_DATA_B is not being influenced by the blinking defect, and the output data B is selected as the signal P_DATA_OUT.

Here, the output data A is data obtained by combining the bit string data of the signal P_DATA_A and the bit data of the signal p_judge in the n-th frame, for example, as illustrated in FIG. 10C. Further, the output data B is data obtained by combining the bit string data of the signal P_DATA_B and the bit data of the signal p_judge in the (n−1)-th frame, for example, as illustrated in FIG. 10D.

In other words, it can be said as follows. It is assumed that the count value in one frame is held in the counter 32, and the count value in the frame immediately preceding the one frame is held in the counter 34. When the determination value indicates that the difference between the count value of the counter 32 and the count value of the counter 34 is equal to or greater than the predetermined value, the output switching circuit 38 outputs a pixel signal including the count value of the counter 34 and the determination value as an output in the one frame. When the determination value indicates that the difference between the count value of the counter 32 and the count value of the counter 34 is less than the predetermined value, the output switching circuit 38 outputs a pixel signal including the count value of the counter 32 and the determination value as an output in the one frame.

In this manner, by switching the output switching circuit 38 according to the calculation result of each pixel 12, the frequency of outputting the data influenced by the blinking defect from the pixel 12 may be reduced, and a high-quality image may be obtained. Further, by incorporating information on whether or not each pixel 12 has detected a blinking defect in the image information and transmitting it to the system in the post-stage, the system in the post-stage may be configured to reduce the intensity of the defect correction based on the information to suppress power consumption.

As described above, according to the present embodiment, it is possible to realize a photoelectric conversion device with higher functionality and higher performance.

Third Embodiment

A schematic configuration of a photoelectric conversion device according to a third embodiment of the disclosure will be described with reference to FIG. 11 and FIG. 12. Components similar to those of the photoelectric conversion device according to the first or second embodiment are denoted by the same reference numerals, and description thereof will be omitted or simplified.

Also in the present embodiment, similarly to the second embodiment, a photoelectric conversion device which is mainly intended to obtain an image with a reduced blinking defect will be described. Although the presence or absence of the blinking defect is determined based on the comparison of the data between the frames of the same pixel 12 in the second embodiment, the presence or absence of the blinking defect is determined with further considering data of pixels 12 arranged adjacent to the periphery in the present embodiment.

Figure 11:
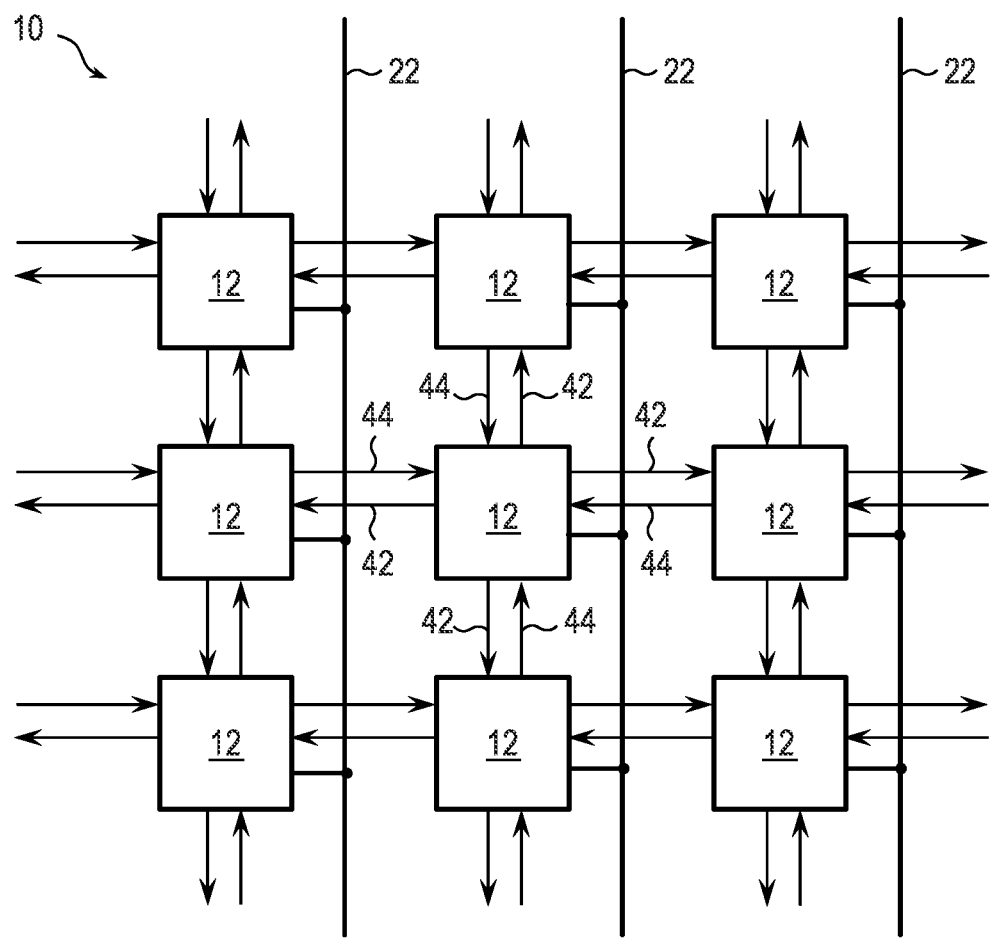
FIG. 11 is a diagram illustrating a configuration example of a pixel region in a photoelectric conversion device according to a third embodiment of the disclosure.

FIG. 11 is a diagram illustrating a configuration example of the pixel region 10 in the photoelectric conversion device according to the present embodiment. FIG. 11 illustrates nine pixels 12 arranged in a block of three columns×three rows among the plurality of pixels 12 constituting the pixel region 10. In FIG. 11, the control lines 14 and 16 and the setting signal line 18 are not illustrated in order to simplify the drawing.

In addition to the configuration of the second embodiment illustrated in FIG. 9, each pixel 12 is configured to output the signal p_judge output from the calculation unit 36 to other pixels 12 arranged adjacent to the periphery. Further, the output switching circuit 38 is configured to receive, in addition to the signal p_judge output from the calculation unit 36 of the same pixel 12, the signal p_judge output from the other pixels 12 arranged adjacent to the periphery. Other basic configurations of the photoelectric conversion device according to the present embodiment are similar to those of the second embodiment.

The signal p_judge output from the calculation unit 36 of one pixel 12 (the center pixel 12 in FIG. 11) is supplied to the surrounding pixels 12 via signal lines 42, for example, as illustrated in FIG. 11. As illustrated in FIG. 11, the signals p_judge output from the calculation units 36 of the surrounding pixels 12 are supplied to the output switching circuit 38 of the central pixel 12 via signal lines 44. Although FIG. 11 illustrates an example in which the signal p_judge output from the calculation unit 36 of the one pixel 12 is output to the four pixels 12 located at the top, bottom, left, and right sides, the signal p_judge may be output to the two pixels 12 located at the top and bottom sides or at the left and right sides. Alternatively, the signal p_judge may be output to the eight pixels 12 in the periphery including the diagonal direction. The same applies to the signal p_judge inputted from the surrounding pixels 12.

FIG. 12 is a diagram illustrating an example of the operation of the output switching circuit 38 in the photoelectric conversion device according to the present embodiment. In the present embodiment, the signal P_DATA_OUT of the n-th frame output from the output switching circuit 38 is determined by the count value of the n-th frame, the determination value of itself of the n-th frame, and the determination value of the surrounding pixels 12 of the n-th frame. The determination value of each pixel 12 may be obtained by, for example, the same calculation as in the second embodiment (FIG. 10A).

When the count value of the n-th frame is given by the signal P_DATA_A, the signal P_DATA_OUT is selected according to the rule illustrated in FIG. 12. That is, when its own determination value in the n-th frame is 1 and all the determination values of the pixels 12 in the periphery are 0, it is determined that the signal P_DATA_A is being influenced by the blinking defect, and the output data B is selected as the signal P_DATA_OUT. When its own determination value in the n-th frame is 1 and all the determination values of the pixels 12 in the periphery are not 0, it is determined that the signal P_DATA_A is not being influenced by the blinking defect, and the output data A is selected as the signal P_DATA_OUT. When its own determination value in the n-th frame is 0, it is determined that the signal P_DATA_A is not influenced by the blinking defect, regardless of the determination values of the surrounding pixels 12, and the output data A is selected as the signal P_DATA_OUT.

Similarly, when the count value of the n-th frame is given by the signal P_DATA_B, the signal P_DATA_OUT is selected according to the rule illustrated in FIG. 12. That is, when its own determination value in the n-th frame is 1 and all the determination values of the pixels 12 in the periphery are 0, it is determined that the signal P_DATA_B is being influenced by the blanking defect, and the output data A is selected as the signal P_DATA_OUT. When its own determination value in the n-th frame is 1 and all the determination values of the pixels 12 in the periphery are not 0, it is determined that the signal P_DATA_B is not being influenced by the blinking defect, and the output data B is selected as the signal P_DATA_OUT. When its own determination value in the n-th frame is 0, it is determined that the signal P_DATA_B is not being influenced by the blinking effect, regardless of the determination value of the surrounding pixels 12, and the output data B is selected as the signal P_DATA_OUT.

In other words, it can be said as follows. It is assumed that the count value in one frame is held in the counter 32, and the count value in the frame immediately preceding the one frame is held in the counter 34. The output switching circuit 38 outputs a pixel signal including the count value of the counter 34 and the determination value output from the calculation unit 36 of the pixel to which the output switching circuit 38 belongs when the following condition is satisfied. The condition in this case is that the difference between the count values of the counters 32 and 34 is equal to or greater than a predetermined value, and all of the determination values output from the calculation units 36 of the other pixels 12 are such that the difference between the count values of the counters 32 and 34 is less than the predetermined value. In other cases, the output switching circuit 38 outputs a pixel signal including the count value of the counter 32 and the determination value output from the calculation unit 36 of the pixel to which the output switching circuit 38 belongs.

In the photoelectric conversion device according to the second embodiment, when a wide region of the pixel region 10 undergoes a large luminance change at a time, it may be determined that a blinking defect occurs in all the pixels 12 included in the region. On the other hand, in the pixel 12 of the photoelectric conversion device according to the present embodiment, data to be output as the signal P_DATA_OUT is selected based on its own determination value of the pixel 12 and the determination values of the surrounding pixels 12. That is, in the photoelectric conversion device according to the present embodiment, when it is determined that there is a large luminance change in the pixel 12 of interest and when it is determined that there is no large luminance change in the pixels 12 surrounding the pixel 12 of interest, it is possible to determine that the blinking defect occurs in the pixel 12 of interest. Therefore, according to the present embodiment, it is possible to appropriately grasp the pixel 12 in which the blinking defect occurs, replace the count value of the pixel 12 in which the blinking defect occurs with the count value of the previous frame, and output the resulting count value. Thereby, it is possible to acquire a high-quality image in which the influence of the blinking defect is appropriately corrected.

As described above, according to the present embodiment, it is possible to realize a photoelectric conversion device with higher functionality and higher performance.

Fourth Embodiment

Figure 13:
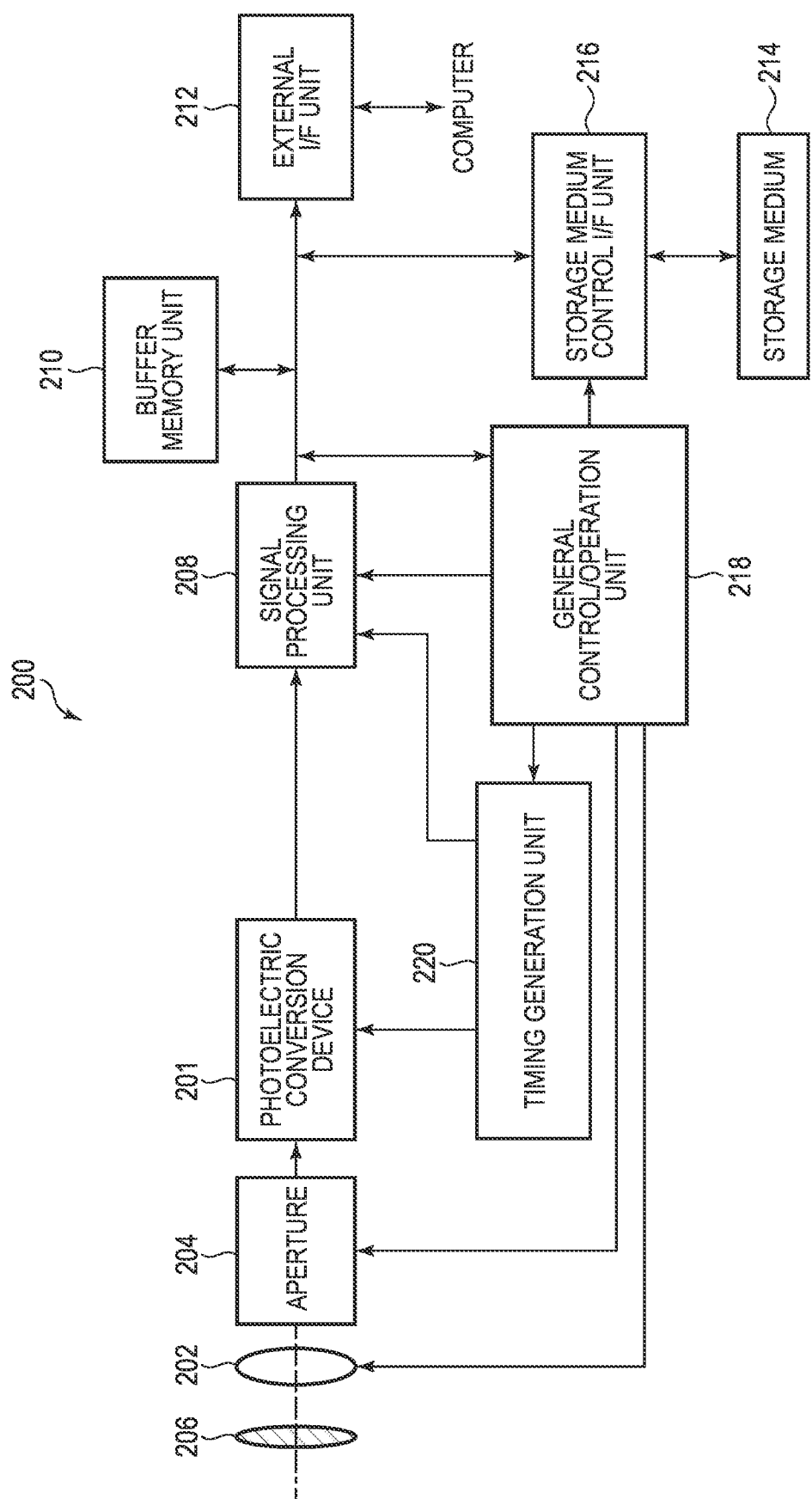
FIG. 13 is a block diagram illustrating a schematic configuration of a photodetection system according to a fourth embodiment of the disclosure.

A photodetection system according to a fourth embodiment of the disclosure will be described with reference to FIG. 13. FIG. 13 is a block diagram illustrating a schematic configuration of the photodetection system according to the present embodiment. In this embodiment, a photodetection sensor to which the photoelectric conversion device 100 according to any one of the first to third embodiments is applied will be described.

The photoelectric conversion device 100 described in the first to third embodiments may be applied to various photodetection systems. Examples of applicable photodetection systems include imaging systems such as digital still cameras, digital camcorders, surveillance cameras, copying machines, facsimiles, mobile phones, on-vehicle cameras, observation satellites, and the like. A camera module including an optical system such as a lens and an imaging device is also included in the photodetection system. FIG. 13 is a block diagram of a digital still camera as an example of these.

The photodetection system 200 illustrated in FIG. 13 includes a photoelectric conversion device 201, a lens 202 for forming an optical image of an object on the photoelectric conversion device 201, an aperture 204 for varying the amount of light passing through the lens 202, and a barrier 206 for protecting the lens 202. The lens 202 and the aperture 204 are optical systems for focusing light on the photoelectric conversion device 201. The photoelectric conversion device 201 is the photoelectric conversion device 100 described in any of the first to third embodiments, and converts the optical image formed by the lens 202 into image data.

The photodetection system 200 also includes a signal processing unit 208 that processes an output signal output from the photoelectric conversion device 201. The signal processing unit 208 generates image data from the digital signal output from the photoelectric conversion device 201. The signal processing unit 208 performs various corrections and compressions as necessary to output image data. The photoelectric conversion device 201 may include an AD (Analog to Digital) conversion unit that generates a digital signal to be processed by the signal processing unit 208. The AD conversion unit may be formed on a semiconductor layer (semiconductor substrate) on which the photon detection element of the photoelectric conversion device 201 is formed, or may be formed on a semiconductor substrate different from the semiconductor layer on which the photon detection element of the photoelectric conversion device 201 is formed. The signal processing unit 208 may be formed on the same semiconductor substrate as the photoelectric conversion device 201.

The photodetection system 200 further includes a buffer memory unit 210 for temporarily storing image data, and an external interface unit (external I/F unit) 212 for communicating with an external computer or the like. Further, the photodetection system 200 includes a storage medium 214 such as a semiconductor memory for storing or reading out captured image data, and a storage medium control interface unit (storage medium control I/F unit) 216 for storing or reading out image data on or from the storage medium 214. The storage medium 214 may be built in the photodetection system 200, or may be detachable. Further, communication between the storage medium control I/F unit 216 and the storage medium 214 and communication from the external I/F unit 212 may be performed wirelessly.

Further, the photodetection system 200 includes a general control/operation unit 218 that controls various calculations and the entire digital still camera, and a timing generation unit 220 that outputs various timing signals to the photoelectric conversion device 201 and the signal processing unit 208. Here, the timing signal or the like may be input from the outside, and the photodetection system 200 may include at least the photoelectric conversion device 201 and the signal processing unit 208 that processes an output signal output from the photoelectric conversion device 201. The timing generation unit 220 may be mounted on the photoelectric conversion device 201. Further, the general control/operation unit 218 and the timing generation unit 220 may be configured to implement some or all of the control functions of the photoelectric conversion device 201.

The photoelectric conversion device 201 outputs an imaging signal to the signal processing unit 208. The signal processing unit 208 performs predetermined signal processing on the imaging signal output from the photoelectric conversion device 201, and outputs image data. The signal processing unit 208 generates an image using the imaging signal. The signal processing unit 208 may be configured to perform a distance measurement operation on a signal output from the photoelectric conversion device 201.

As described above, according to the present embodiment, by configuring the photodetection system using the photoelectric conversion devices according to any of the first to third embodiments, it is possible to realize a photodetection system capable of obtaining a higher quality image.

Fifth Embodiment

Figure 14:
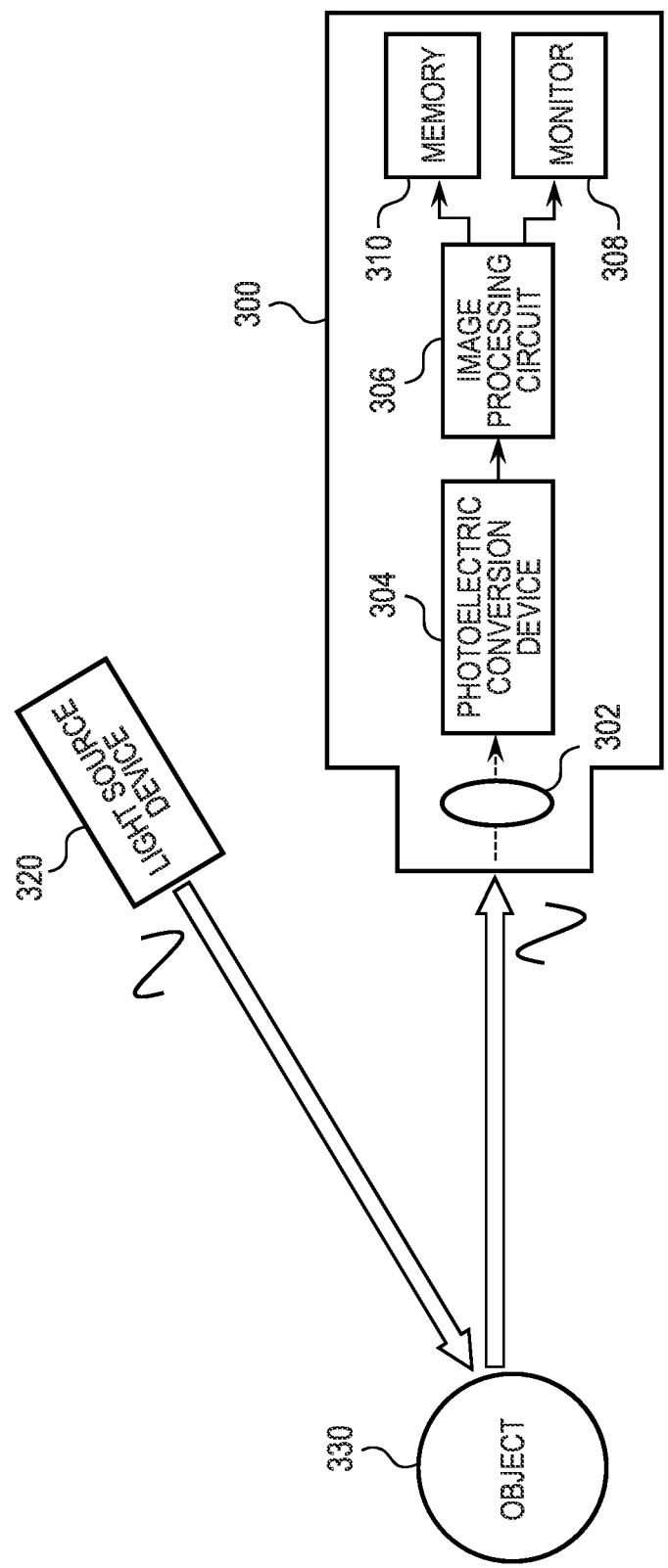
FIG. 14 is a block diagram illustrating a schematic configuration of a range image sensor according to a fifth embodiment of the disclosure.

A range image sensor according to a fifth embodiment of the disclosure will be described with reference to FIG. 14. FIG. 14 is a block diagram illustrating a schematic configuration of the range image sensor according to the present embodiment. In the present embodiment, a range image sensor will be described as an example of a photodetection system to which the photoelectric conversion device 100 according to any one of the first to third embodiments is applied.

As illustrated in FIG. 14, the range image sensor 300 according to the present embodiment may include an optical system 302, a photoelectric conversion device 304, an image processing circuit 306, a monitor 308, and a memory 310. The range image sensor 300 receives light (modulated light or pulse light) emitted from a light source device 320 toward an object 330 and reflected by the surface of the object 330, and acquires a distance image corresponding to the distance to the object 330.

The optical system 302 includes one or a plurality of lenses, and has a role of forming an image of image light (incident light) from the object 330 on a light receiving surface (sensor unit) of the photoelectric conversion device 304.

The photoelectric conversion device 304 is the photoelectric conversion device 100 described in any of the first to third embodiments, and has a function of generating a distance signal indicating the distance to the object 330 based on the image light from the object 330 and supplying the generated distance signal to the image processing circuit 306.

The image processing circuit 306 has a function of performing image processing for constructing a distance image based on the distance signal supplied from the photoelectric conversion device 304.

The monitor 308 has a function of displaying a distance image (image data) obtained by image processing in the image processing circuit 306. The memory 310 has a function of storing (recording) a distance image (image data) obtained by image processing in the image processing circuit 306.

As described above, according to the present embodiment, by configuring the range image sensor using the photoelectric conversion device according to any of the first to third embodiments, it is possible to realize a range image sensor capable of acquiring a distance image including more accurate distance information in conjunction with improvement in characteristics of the pixels 12.

Sixth Embodiment

Figure 15:
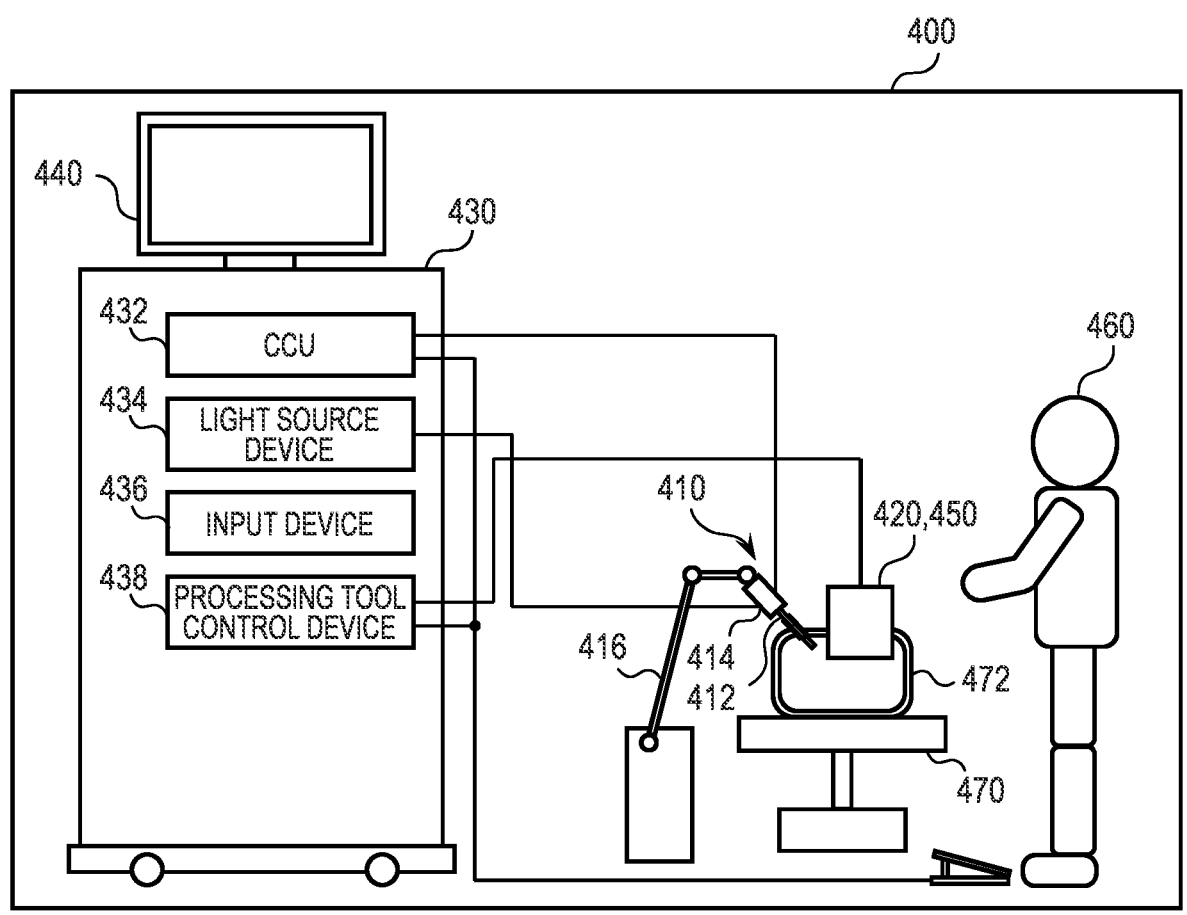
FIG. 15 is a schematic diagram illustrating a configuration example of an endoscopic surgical system according to a sixth embodiment of the disclosure.

An endoscopic surgical system according to a sixth embodiment of the disclosure will be described with reference to FIG. 15. FIG. 15 is a schematic diagram illustrating a configuration example of the endoscopic surgical system according to the present embodiment. In the present embodiment, an endoscopic surgical system will be described as an example of a photodetection system to which the photoelectric conversion device 100 described in any one of the first to third embodiments is applied.

FIG. 15 illustrates a state in which an operator (surgeon) 460 performs a surgery on a patient 472 on a patient bed 470 using an endoscopic surgical system 400.

As illustrated in FIG. 15, the endoscopic surgical system 400 according to the present embodiment may include an endoscope 410, a surgical tool 420, and a cart 430 on which various devices for endoscopic surgery are mounted. The cart 430 may include a CCU (Camera Control Unit) 432, a light source device 434, an input device 436, a processing tool control device 438, a display device 440, and the like.

The endoscope 410 includes a lens barrel 412 in which an area of a predetermined length from the tip is inserted into the body cavity of the patient 472, and a camera head 414 connected to the base end of the lens barrel 412. Although FIG. 15 illustrates an endoscope 410 configured as a rigid mirror having a rigid lens barrel 412, the endoscope 410 may be configured as a flexible mirror having a flexible lens barrel. The endoscope 410 is held in a movable state by an arm 416.

An opening into which an objective lens is fitted is provided at the tip of the lens barrel 412. The light source device 434 is connected to the endoscope 410, and light generated by the light source device 434 is guided to the tip of the lens barrel 412 by a light guide extended inside the lens barrel 412, and is irradiated to an observation target in the body cavity of the patient 472 via the objective lens. The endoscope 410 may be a direct-viewing mirror, an oblique-viewing mirror, or a side-viewing mirror.

An optical system and a photoelectric conversion device (not illustrated) are provided inside the camera head 414, and reflected light (observation light) from the observation target is focused on the photoelectric conversion device by the optical system. The photoelectric conversion device photoelectrically converts the observation light and generates an electric signal corresponding to the observation light, i.e., an image signal corresponding to the observation image. As the photoelectric conversion device, the photoelectric conversion device 100 described in any of the first to third embodiments may be used. The image signal is transmitted to the CCU 432 as RAW data.

The CCU 432 is configured by a CPU (Central Processing Unit), a GPU (Graphics Processing Unit), and the like, and integrally controls the operation of the endoscope 410 and the display device 440. Further, the CCU 432 receives an image signal from the camera head 414, and performs various types of image processing for displaying an image based on the image signal, such as development processing (demosaic processing), on the image signal.

The display device 440 displays an image based on the image signal subjected to the image processing by the CCU 432 under the control of the CCU 432. The light source device 434 is configured by, for example, a light source such as an LED (Light Emitting Diode), and supplies irradiation light to the endoscope 410 when capturing an image of a surgical part or the like. The input device 436 is an input interface for the endoscopic surgical system 400. The user may input various kinds of information and instructions to the endoscopic surgical system 400 via the input device 436. The processing tool control device 438 controls the actuation of the energy processing tool 450 for tissue ablation, incision, blood vessel sealing, etc.

The light source device 434 for supplying the irradiation light to the endoscope 410 when capturing an image of the surgical part may be composed of a white light source composed of, for example, an LED, a laser light source, or a combination thereof. When a white light source is constituted by a combination of RGB laser light sources, since the output intensity and output timing of each color (each wavelength) may be controlled with high accuracy, the white balance of the captured image may be adjusted in the light source device 434. In this case, the observation object is irradiated with the laser light from each of the RGB laser light sources in a time division manner, and the driving of the imaging element of the camera head 414 is controlled in synchronization with the irradiation timing, whereby the images corresponding to the RGB light sources may be captured in a time division manner. According to this method, a color image may be obtained without providing a color filter in the imaging element.

Further, the driving of the light source device 434 may be controlled so as to change the intensity of the output light every predetermined time. By controlling the driving of the imaging element of the camera head 414 in synchronization with the timing of changing the intensity of the light to acquire images in a time-division manner and compositing the images, it is possible to generate an image in a high dynamic range without so-called blocked up shadows and blown out highlights.

The light source device 434 may be configured to be capable of supplying light in a predetermined wavelength band corresponding to the special light observation. In the special light observation, for example, wavelength dependency of light absorption in body tissue is utilized. Specifically, a predetermined tissue such as a blood vessel in the surface layer of the mucosa is imaged with high contrast by irradiating light in a narrower band compared to the irradiation light (i.e., white light) during normal observation. Alternatively, in the special light observation, fluorescence observation for obtaining an image by fluorescence generated by irradiation with excitation light may be performed. In the fluorescence observation, the body tissue may be irradiated with excitation light to observe fluorescence from the body tissue, or a reagent such as indocyanine green (ICG) may be locally poured into the body tissue, and the body tissue may be irradiated with excitation light corresponding to the fluorescence wavelength of the reagent to obtain a fluorescence image. The light source device 434 may be configured to supply narrowband light and/or excitation light corresponding to such special light observation.

As described above, according to the present embodiment, by configuring the endoscopic surgical system using the photoelectric conversion device according to any of the first embodiment, it is possible to realize an endoscopic surgical system capable of acquiring images of better quality.

Seventh Embodiment

Figure 16A:
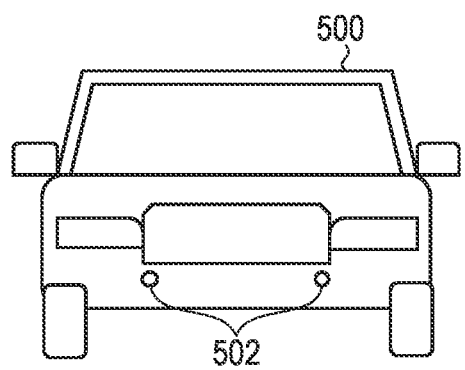
FIG. 16A, FIG. 16B, and FIG. 16C are schematic diagrams illustrating a configuration example of a movable object according to a seventh embodiment of the disclosure.
Figure 16B:
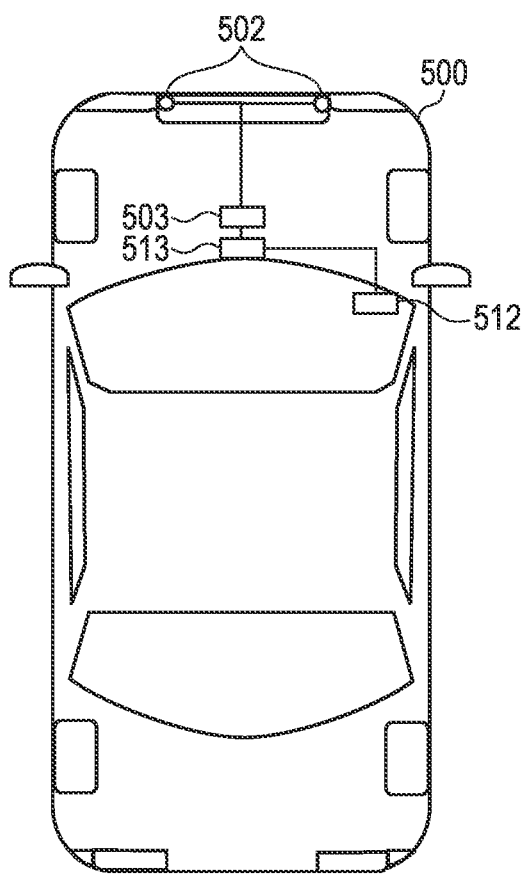
Figure 16C:
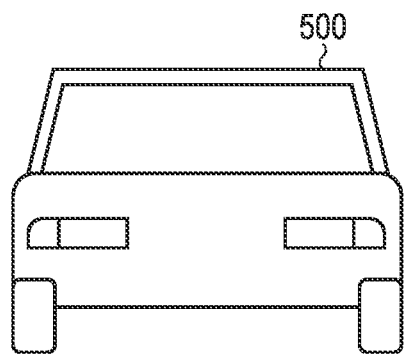
Figure 17:
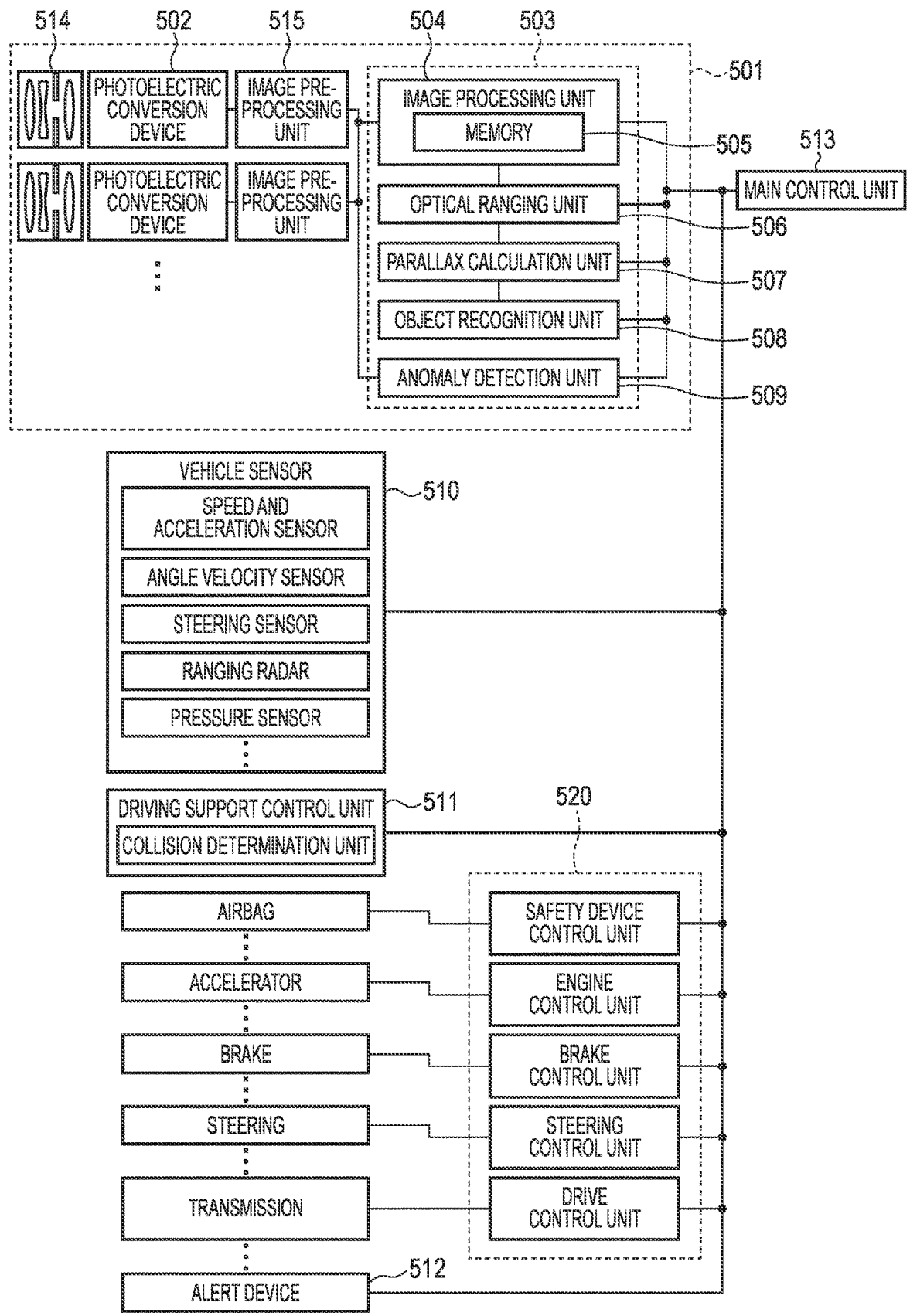
FIG. 17 is a block diagram illustrating a schematic configuration of a photodetection system according to a seventh embodiment of the disclosure.
Figure 18:
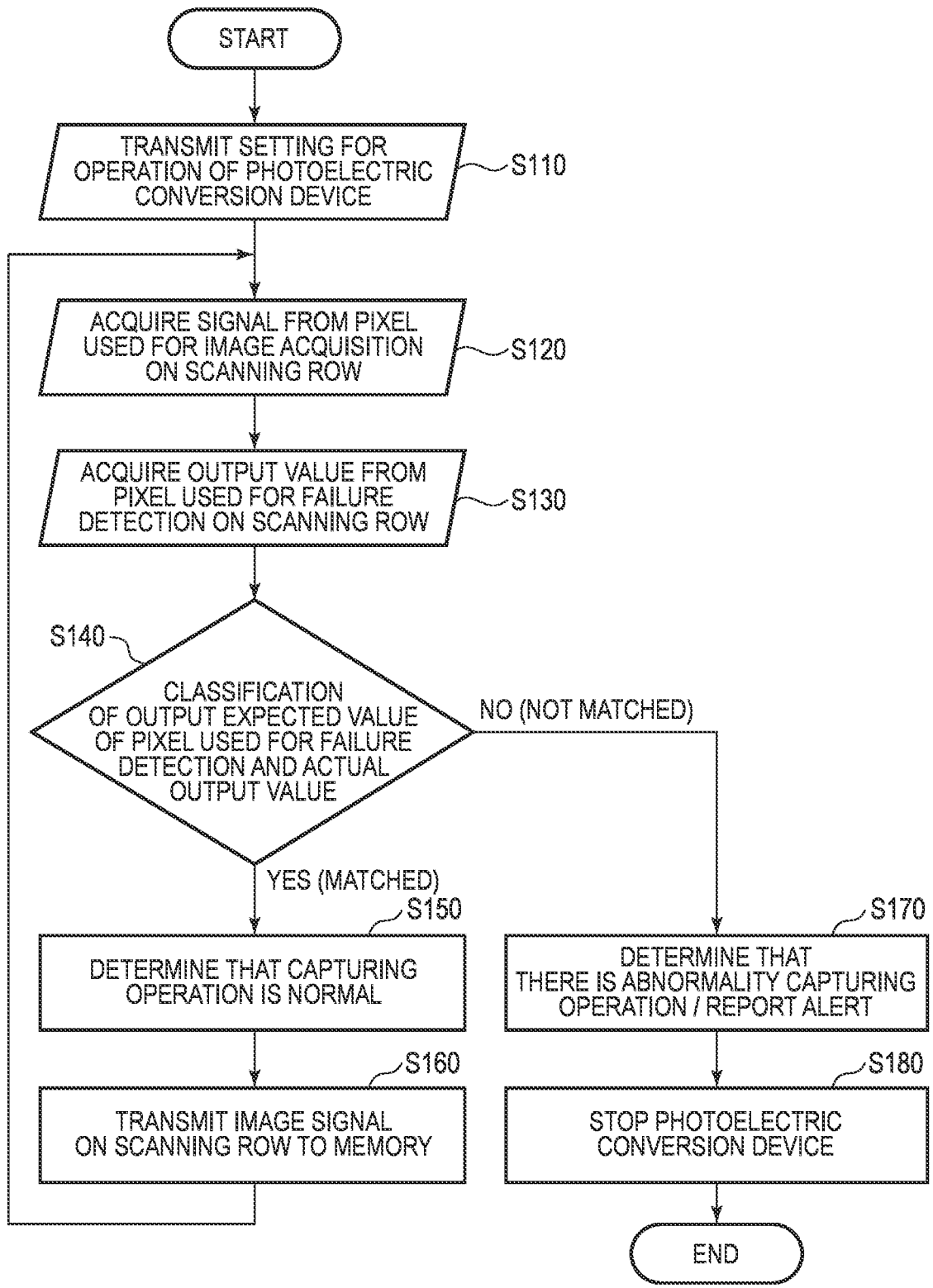
FIG. 18 is a flowchart illustrating an operation of the photodetection system according to the seventh embodiment of the disclosure.

A photodetection system and a movable object according to a seventh embodiment of the disclosure will be described with reference to FIG. 16A to FIG. 18. FIG. 16A to FIG. 16C are schematic diagrams illustrating a configuration example of the movable object according to the present embodiment. FIG. 17 is a block diagram illustrating a schematic configuration of the photodetection system according to the present embodiment. FIG. 18 is a flowchart illustrating the operation of the photodetection system according to the present embodiment. In the present embodiment, an application example to an on-vehicle camera will be described as a photodetection system to which the photoelectric conversion device 100 described in any one of the first to third embodiments is applied.

FIG. 16A to FIG. 16C are schematic diagrams illustrating a configuration example of the movable object (a vehicle system) according to the present embodiment. FIG. 16A to FIG. 16C illustrate a configuration of a vehicle 500 (an automobile) as an example of a vehicle system incorporating a photodetection system to which the photoelectric conversion device described in any one of the first to third embodiments is applied. FIG. 16A is a schematic front view of the vehicle 500, FIG. 16B is a schematic plan view of the vehicle 500, and FIG. 16C is a schematic rear view of the vehicle 500. The vehicle 500 includes a pair of photoelectric conversion devices 502 on the front side thereof. Here, the photoelectric conversion devices 502 are the photoelectric conversion device 100 described in any of the first to third embodiments. The vehicle 500 includes an integrated circuit 503, an alert device 512, and a main control unit 513.

FIG. 17 is a block diagram illustrating a configuration example of a photodetection system 501 mounted on the vehicle 500. The photodetection system 501 includes the photoelectric conversion device 502, an image preprocessing unit 515, an integrated circuit 503, and an optical system 514. The photoelectric conversion device 502 is the photoelectric conversion device 100 described in any of the first to third embodiments. The optical system 514 forms an optical image of an object on the photoelectric conversion device 502. The photoelectric conversion device 502 converts an optical image of the object formed by the optical system 514 into an electric signal. The image preprocessing unit 515 performs predetermined signal processing on the signal output from the photoelectric conversion device 502. The function of the image preprocessing unit 515 may be incorporated in the photoelectric conversion device 502. The photodetection system 501 is provided with at least two sets of the optical system 514, the photoelectric conversion device 502, and the image preprocessing unit 515, and outputs from the image preprocessing units 515 of each set are input to the integrated circuit 503.

The integrated circuit 503 is an integrated circuit for use in an imaging system, and includes an image processing unit 504, an optical ranging unit 506, a parallax calculation unit 507, an object recognition unit 508, and an abnormality detection unit 509. The image processing unit 504 processes the image signal output from the image preprocessing unit 515. For example, the image processing unit 504 performs image processing such as development processing and defect correction on the output signal of the image preprocessing unit 515. The image processing unit 504 includes a memory 505 for temporarily storing image signals. The memory 505 may store, for example, the position of a known defective pixel in the photoelectric conversion device 502.

The optical ranging unit 506 performs focusing and distance measurement of the object. The parallax calculation unit 507 calculates distance measurement information (distance information) from a plurality of image data (parallax images) acquired by the plurality of photoelectric conversion devices 502. Each of the photoelectric conversion devices 502 may have a configuration capable of acquiring various kinds of information such as distance information. The object recognition unit 508 recognizes an object such as a vehicle, a road, a sign, or a person. When the abnormality detection unit 509 detects an abnormality of the photoelectric conversion device 502, the abnormality detection unit 509 notifies the main control unit 513 of the abnormality.

The integrated circuit 503 may be implemented by dedicated hardware, software modules, or a combination thereof. Further, it may be implemented by FPGA (Field Programmable Gate Array), ASIC (Application Specific Integrated Circuit), or the like, or may be implemented by a combination of these.

The main control unit 513 collectively controls the operations of the photodetection system 501, the vehicle sensor 510, the control unit 520, and the like. The vehicle 500 may not include the main control unit 513. In this case, the photoelectric conversion device 502, the vehicle sensor 510, and the control unit 520 transmit and receive control signals via a communication network. For example, the CAN (Controller Area Network) standard may be applied to transmit and receive the control signals.

The integrated circuit 503 has a function of receiving a control signal from the main control unit 513 or transmitting a control signal and a setting value to the photoelectric conversion device 502 by its own control unit.

The photodetection system 501 is connected to the vehicle sensor 510, and may detect a traveling state of the own vehicle such as a vehicle speed, a yaw rate, a steering angle, and the like, an environment outside the own vehicle, and states of other vehicles and obstacles. The vehicle sensor 510 is also a distance information acquisition means for acquiring distance information to the object. The photodetection system 501 is connected to a driving support control unit 511 that performs various driving support functions such as an automatic steering function, an automatic cruising function, and a collision prevention function. In particular, with regard to the collision determination function, based on the detection results of the photodetection system 501 and the vehicle sensor 510, it is determined whether or not there is a collision with another vehicle or an obstacle. Thus, avoidance control when a collision is estimated and activation of the safety device at the time of collision are performed.

The photodetection system 501 is also connected to an alert device 512 that issues an alert to the driver based on the determination result of the collision determination unit. For example, when the collision possibility is high as the determination result of the collision determination unit, the main control unit 513 performs vehicle control to avoid collision and reduce damage by braking, returning an accelerator, suppressing engine output, or the like. The alert device 512 alerts a user by sounding an alarm such as a sound, displaying alert information on a display screen of a car navigation system or a meter panel, or applying vibration to a seat belt or a steering wheel.

In the present embodiment, the photodetection system 501 images the periphery of the vehicle, for example, the front side or the rear side. FIG. 16B illustrates an example of the arrangement of the photodetection system 501 when the photodetection system 501 captures an image in front of the vehicle.

As described above, the photoelectric conversion device 502 is disposed in front of the vehicle 500. More specifically, when a center line with respect to a forward/backward direction of the vehicle 500 or an outer shape (e.g., a vehicle width) is regarded as a symmetry axis, and two photoelectric conversion devices 502 are disposed axisymmetrically with respect to the symmetry axis, distance information between the vehicle 500 and an object to be imaged is acquired and to determine a collision possibility. Further, in one embodiment, the photoelectric conversion device 502 is disposed so as not to obstruct the field of view of the driver when the driver sees a situation outside the vehicle 500 from the driver's seat. The alert device 512 is arranged to be easy to enter the field of view of the driver.

Next, a failure detection operation of the photoelectric conversion device 502 in the photodetection system 501 will be described with reference to FIG. 18. The failure detection operation of the photoelectric conversion device 502 may be performed according to steps S110 to S180 illustrated in FIG. 18.

Step S110 is a step of performing setting at the time of startup of the photoelectric conversion device 502. That is, a setting for the operation of the photoelectric conversion device 502 is transmitted from the outside of the photodetection system 501 (for example, the main control unit 513) or from the inside of the photodetection system 501, and the imaging operation and the failure detection operation of the photoelectric conversion device 502 are started.

Next, in step S120, pixel signals are acquired from the effective pixels. In step S130, an output value from the failure detection pixel provided for failure detection is acquired. The failure detection pixel includes a photoelectric conversion element as in the case of the effective pixel. A predetermined voltage is written to the photoelectric conversion element. The failure detection pixel outputs a signal corresponding to the voltage written to the photoelectric conversion element. Step S120 and step S130 may be reversed.

Next, in step S140, a classification of the output expected value of the failure detection pixel and the actual output value from the failure detection pixel is performed. As a result of the classification in step S140, when the output expected value matches the actual output value, the process proceeds to step S150, it is determined that the imaging operation is normally performed, and the process proceeds to step S160. In step S160, the pixel signals of the scanning row are transmitted to the memory 505 to temporarily store them. After that, the process returns to step S120 to continue the failure detection operation. On the other hand, as a result of the classification in step S140, when the output expected value does not match the actual output value, the processing step proceeds to step S170. In step S170, it is determined that there is an abnormality in the imaging operation, and an alert is notified to the main control unit 513 or the alert device 512. The alert device 512 causes the display unit to display that an abnormality has been detected. Thereafter, in step S180, the photoelectric conversion device 502 is stopped, and the operation of the photodetection system 501 is terminated.

Although the present embodiment exemplifies the example in which the flowchart is looped for each row, the flowchart may be looped for each plurality of rows, or the failure detection operation may be performed for each frame. The alert of step S170 may be notified to the outside of the vehicle via the wireless network.

Further, in the present embodiment, the control in which the own vehicle does not collide with other vehicles has been described, but the disclosure is also applicable to a control in which the own vehicle is automatically driven following another vehicle, a control in which the own vehicle is automatically driven so as not to go out of the lane, and the like. Further, the photodetection system 501 may be applied not only to a vehicle such as an own vehicle but also to, for example, other movable object (moving devices) such as a ship, an aircraft, or an industrial robot. In addition, the disclosure may be applied not only to a movable object but also to equipment using object recognition in a wide range such as an ITS (Intelligent Transport System).

Eighth Embodiment

Figure 19A:
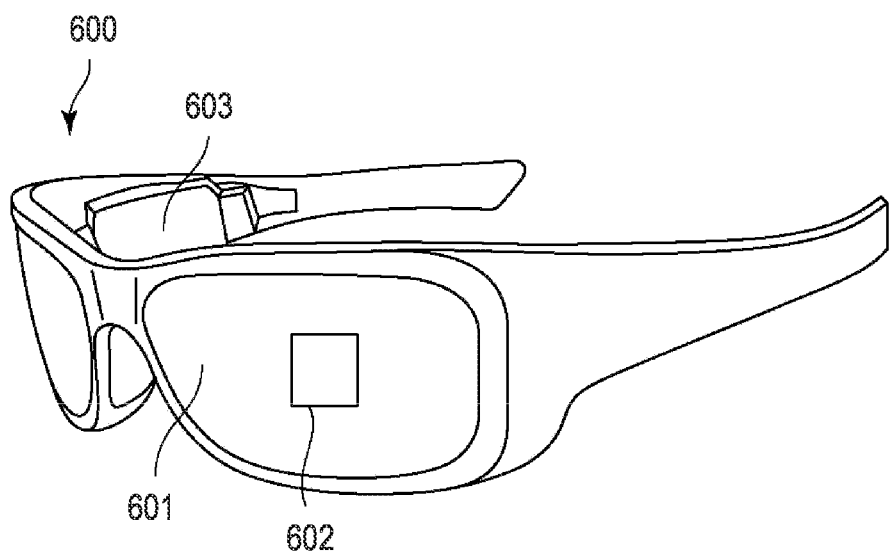
FIG. 19A and FIG. 19B are schematic diagrams illustrating a schematic configuration of a photodetection system according to an eighth embodiment of the disclosure.
Figure 19B:
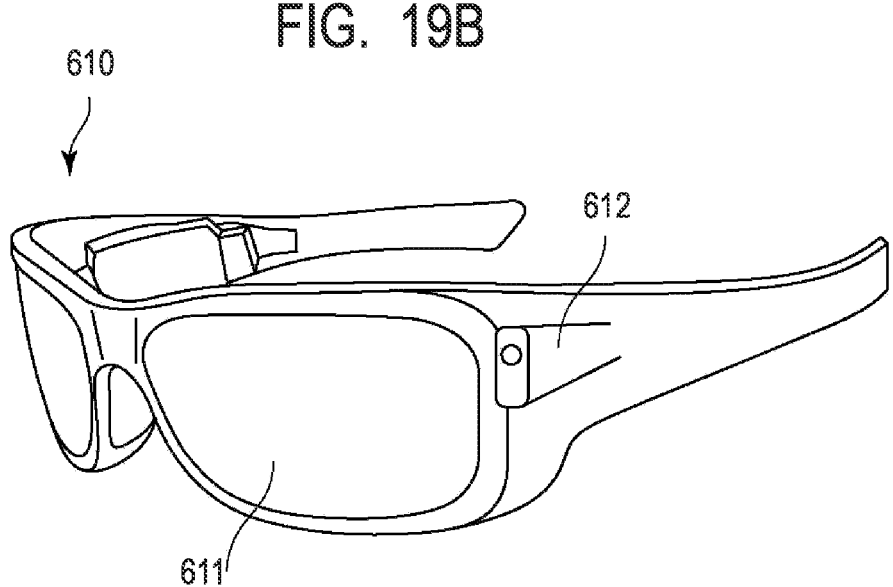

A photodetection system according to an eighth embodiment of the disclosure will be described with reference to FIG. 19A and FIG. 19B. FIG. 19A and FIG. 19B are schematic diagrams illustrating a configuration example of a photodetection system according to the present embodiment. In the present embodiment, an application example to eyeglasses (smart glasses) will be described as a photodetection system to which the photoelectric conversion device 100 described in any one of the first to third embodiments is applied.

FIG. 19A illustrates eyeglasses 600 (smartglasses) according to one application example. The eyeglasses 600 include lenses 601, a photoelectric conversion device 602, and a control device 603.

The photoelectric conversion device 602 is the photoelectric conversion device 100 described in any of the first to third embodiments, and is provided on the lens 601. One photoelectric conversion device 602 or a plurality of photoelectric conversion devices 602 may be provided on the lens 601. When a plurality of photoelectric conversion devices 602 is used, a plurality of types of photoelectric conversion devices 602 may be used in combination. The arrangement position of the photoelectric conversion device 602 is not limited to that illustrated in FIG. 19A. A display device (not illustrated) including a light emitting device such as an OLED or an LED may be provided on the rear surface side of the lens 601.

The control device 603 functions as a power supply for supplying power to the photoelectric conversion device 602 and the display device. The control device 603 has a function of controlling the operation of the photoelectric conversion device 602 and the display device. The lens 601 is provided with an optical system for focusing light on the photoelectric conversion device 602.

FIG. 19B illustrates eyeglasses 610 (smartglasses) according to another application example. The eyeglasses 610 include lenses 611 and a control device 612. A photoelectric conversion device corresponding to the photoelectric conversion device 602 and a display device (not illustrated) may be mounted on the control device 612.

The lens 611 is provided with a photoelectric conversion device in the control device 612 and an optical system for projecting light from the display device, and an image is projected thereon. The control device 612 functions as a power supply for supplying power to the photoelectric conversion device and the display device, and has a function of controlling the operation of the photoelectric conversion device and the display device.

The control device 612 may further include a line-of-sight detection unit that detects the line-of-sight of the wearer. In this case, an infrared light emitting unit is provided in the control device 612, and infrared light emitted from the infrared light emitting unit may be used for detection of a line-of-sight. Specifically, the infrared light emitting unit emits infrared light to the eyeball of the user who is watching the display image. The reflected light of the emitted infrared light from the eyeball is detected by the imaging unit having the light receiving element, whereby a captured image of the eyeball is obtained. By providing a reduction unit that reduces light from the infrared light emitting unit to the display unit in a plan view, a decrease in image quality may be reduced.

The line-of-sight of the user with respect to the display image may be detected from the captured image of the eyeball obtained by capturing the infrared light. Any known method may be applied to the line-of-sight detection using the captured image of the eyeball. As an example, a line-of-sight detection method based on a Purkinje image caused by reflection of irradiation light on the cornea may be used. More specifically, a line-of-sight detection processing based on the pupil cornea reflection method is performed. By using the pupil cornea reflection method, a line-of-sight vector representing the direction (rotation angle) of the eyeball is calculated based on the image of the pupil image and the Purkinje image included in the captured image of the eyeball, whereby the line-of-sight of the user is detected.

The display device according to the present embodiment may include a photoelectric conversion device having a light receiving element, and may be configured to control a display image based on line-of-sight information of a user from the photoelectric conversion device. Specifically, the display device determines a first viewing area to be gazed by the user and a second viewing area other than the first viewing area based on the line-of-sight information. The first viewing area and the second viewing area may be determined by a control device of the display device, or may be determined by an external control device. When an external control device determines, the determination result is transmitted to the display device via communication. In the display region of the display device, the display resolution of the first viewing area may be controlled to be higher than the display resolution of the second viewing area. That is, the resolution of the second viewing area may be lower than the resolution of the first viewing area.

Further, the display area may have a first display area and a second display area different from the first display area, and may be configured to determine an area having a high priority from the first display area and the second display area based on the line-of-sight information. The first display area and the second display area may be determined by a control device of the display device, or may be determined by an external control device. When an external control device determines, the determination result is transmitted to the display device via communication. The resolution of the area with high priority may be controlled to be higher than the resolution of the area other than the area with high priority. That is, the resolution of the area having a relatively low priority may be reduced.

An AI (Artificial Intelligence) may be used to determine the first viewing area or the area with high priority. The AI may be a model configured to estimate an angle of a line-of-sight and a distance to a target object ahead of the line-of-sight from an image of an eyeball, using an image of the eyeball and a direction in which the eyeball of the image is actually viewed as teacher data. The AI program may be held by the display device, the photoelectric conversion device, or an external device. When the external device has, the information is transmitted to the display device via communication.

When the display control is performed based on the visual recognition detection, the disclosure may be applied to smartglasses which further includes a photoelectric conversion device for capturing an image of the outside. The smartglasses may display captured external information in real time.

Modified Embodiments

The disclosure is not limited to the above embodiment, and various modifications are possible.

For example, an example in which some of the configurations of any of the embodiments are added to other embodiments or an example in which some of the configurations of any of the embodiments are substituted with some of the configurations of the other embodiments is also an embodiment of the disclosure.

Further, in the first to third embodiments, the pulse counting unit 30 is configured by the two counters 32 and 34, but the number of counters constituting the pulse counting unit 30 is not limited to two and may be three or more. When the pulse counting unit 30 is composed of three or more counters, the count values of three or more frames may be held at the same time, and the calculation unit 36 and the output switching circuit 38 may perform more complicated operations.

The circuit configuration of the pixel 12 is not limited to the above embodiment. For example, a switch such as a transistor may be provided between the photoelectric conversion element PD and the quenching element 24 or between the photoelectric conversion element PD and the waveform shaping unit 26 to control an electrical connection state therebetween. Further, a switch such as a transistor may be provided between the node to which the voltage VDD is supplied and the quenching element 24 and/or between the node to which the voltage VSS is supplied and the photoelectric conversion element PD to control an electrical connection state therebetween.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-085325, filed May 25, 2022 which is hereby incorporated by reference herein in its entirety.

What is claimed is:

1. A photoelectric conversion device comprising:
a pixel including a photoelectric conversion unit configured to output a pulse according to incidence of a photon, a counting unit including a plurality of counters each configured to count pulses output from the photoelectric conversion unit, and a calculation unit configured to perform calculation processing on a plurality of count values held by the plurality of counters; and
an output line connected to the pixel,
wherein the calculation unit outputs a determination value indicating a relationship between the plurality of count values, and
wherein the pixel outputs a pixel signal including the determination value to the output line.

2. The photoelectric conversion device according to claim 1, wherein the pixel further includes a switching circuit configured to switch a signal to be output according to the determination value.

3. The photoelectric conversion device according to claim 2, wherein the switching circuit outputs, according to the determination value, one of a pixel signal including one of the determination value and the plurality of count values and a pixel signal including the determination value and one of the plurality of count values.

4. The photoelectric conversion device according to claim 2,
wherein the plurality of counters includes a first counter and a second counter, and
wherein the calculation unit outputs the determination value indicating whether or not a difference between a count value of the first counter and a count value of the second counter is equal to or greater than a predetermined value.

5. The photoelectric conversion device according to claim 4, wherein when the determination value indicates that the difference is equal to or greater than the predetermined value, the switching circuit outputs the determination value from one output node among a plurality of output nodes for outputting each bit of the pixel signal, and sets output nodes corresponding to the other bits, except a bit from which the determination value is output, to high impedance state.

6. The photoelectric conversion device according to claim 4, wherein when the determination value indicates that the difference is less than the predetermined value, the switching circuit outputs the determination value from one output node among a plurality of output nodes for outputting each bit of the pixel signal, and outputs data corresponding to a count value of the first counter from the other output nodes excluding the one output node.

7. The photoelectric conversion device according to claim 2,
wherein the plurality of counters includes a first counter and a second counter, the first counter holds a count value in one frame, and the second counter holds a count value in a frame immediately preceding the one frame, and
wherein the switching circuit outputs, when the determination value indicates that a difference between a count value of the first counter and a count value of the second counter is equal to or greater than a predetermined value, the pixel signal including the count value of the second counter and the determination value as an output in the one frame, and
wherein the switching circuit outputs, when the determination value indicates that a difference between the count value of the first counter and the count value of the second counter is less than the predetermined value, the pixel signal including the count value of the first counter and the determination value as an output in the one frame.

8. A photodetection system comprising:
the photoelectric conversion device according to claim 1; and
a signal processing device configured to process a signal output from the photoelectric conversion device.

9. The photodetection system according to claim 8, wherein the signal processing device is configured to generate a distance image representing distance information to an object based on the signal.

10. A movable object comprising:
the photoelectric conversion device according to claim 1;
a distance information acquisition unit configured to acquire distance information to an object from a parallax image based on a signal output from the conversion device; and
a control unit configured to control the movable object based on the distance information.

11. A photoelectric conversion device comprising:
a plurality of pixels each including a photoelectric conversion unit configured to output a pulse according to incidence of a photon, a counting unit including a plurality of counters each configured to count pulses output from the photoelectric conversion unit, a calculation unit configured to perform calculation processing on a plurality of count values output from the plurality of counters and output a determination value indicating a relationship between the plurality of count values, and a switching circuit configured to switch a signal output as a pixel signal according to the determination value; and
a control circuit configured to receive pixel signals output from the plurality of pixels,
wherein each of the plurality of pixels outputs the pixel signal including the determination value to the control circuit, and
wherein the control circuit controls the switching circuit of the plurality of pixels according to the determination value received from the plurality of pixels.

12. The photoelectric conversion device according to claim 11, wherein, when a state in which a sum of the determination values of the plurality of pixels is less than a predetermined value continues for a predetermined period or longer, the control circuit controls the switching circuit of the plurality of pixels to output the pixel signal including the determination value and not including the plurality of count values.

13. The photoelectric conversion device according to claim 11, wherein, when a sum of the determination values of the plurality of pixels is equal to or greater than a predetermined value, the control circuit controls the switching circuit of the plurality of pixels to output the pixel signal including any of the plurality of count values and the determination value.

14. The photoelectric conversion device according to claim 11 further comprising a circuit for processing the pixel signals output from each of the plurality of pixels,
wherein the control circuit limits a function of the circuit and reduces power consumption when a state in which a sum of the determination values of the plurality of pixels is less than a predetermined value continues for a predetermined period or longer.

15. A photodetection system comprising:
the photoelectric conversion device according to claim 11; and
a signal processing device configured to process a signal output from the photoelectric conversion device.

16. The photodetection system according to claim 15, wherein the signal processing device is configured to generate a distance image representing distance information to an object based on the signal.

17. A movable object comprising:
the photoelectric conversion device according to claim 11;
a distance information acquisition unit configured to acquire distance information to an object from a parallax image based on a signal output from the photoelectric conversion device; and
a control unit configured to control the movable object based on the distance information.

18. A photoelectric conversion device comprising:
a plurality of pixels each including a photoelectric conversion unit configured to output a pulse according to incidence of a photon, a counting unit including a plurality of counters each configured to count pulses output from the photoelectric conversion unit, a calculation unit configured to perform calculation processing on a plurality of count values output from the plurality of counters and outputs a determination value indicating a relationship between the plurality of count values, and a switching circuit configured to switch a signal output according to the determination value,
wherein each of the plurality of pixels is configured to receive the determination value from the calculation unit of the other pixels adjacent thereto, and
wherein the switching circuit selects a signal to be output as a pixel signal in accordance with the determination value output from the calculation unit of the own pixel to which it belongs and the determination values output from the calculation units of the other pixels.

19. The photoelectric conversion device according to claim 18,
wherein the plurality of counters includes a first counter and a second counter, the first counter holds a count value in one frame, and the second counter holds a count value in a frame immediately preceding the one frame,
wherein the switching circuit outputs, when the determination value output from the calculation unit of the own pixel indicates that a difference between a count value of the first counter and the count value of the second counter is equal to or greater than a predetermined value, and all the determination values output from the calculation units of the other pixels indicates that a difference between the count value of the first counter and the count value of the second counter is less than the predetermined value, the pixel signal including a count value of the second counter and the determination value output from the calculation unit of the own pixel, and
wherein the switching circuit outputs in other cases the pixel signal including the count value of the first counter and the determination value output from the calculation unit of the own pixel.

20. A photodetection system comprising:
the photoelectric conversion device according to claim 18; and
a signal processing device configured to process a signal output from the photoelectric conversion device.

21. The photodetection system according to claim 20, wherein the signal processing device is configured to generate a distance image representing distance information to an object based on the signal.

22. A movable object comprising:
the photoelectric conversion device according to claim 18;
a distance information acquisition unit configured to acquire distance information to an object from a parallax image based on a signal output from the photoelectric conversion device; and
a control unit configured to control the movable object based on the distance information.

* * * * *